United States Patent
Aikawa et al.

(10) Patent No.: US 7,233,728 B2
(45) Date of Patent: Jun. 19, 2007

(54) DISPERSION COMPENSATING OPTICAL FIBER

(75) Inventors: Kazuhiko Aikawa, Sakura (JP); Shogo Shimizu, Sakura (JP); Ryuji Suzuki, Sakura (JP); Masakazu Nakayama, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 5 days.

(21) Appl. No.: 10/507,078

(22) PCT Filed: Mar. 13, 2003

(86) PCT No.: PCT/JP03/03004

§ 371 (c)(1),
(2), (4) Date: May 27, 2005

(87) PCT Pub. No.: WO03/076991

PCT Pub. Date: Sep. 18, 2003

(65) Prior Publication Data

US 2005/0249471 A1    Nov. 10, 2005

(30) Foreign Application Priority Data

Mar. 13, 2002   (JP)   ............................... 2002-069077
Mar. 4, 2003    (JP)   ............................... 2003-057013

(51) Int. Cl.
   *G02B 6/02*   (2006.01)
(52) U.S. Cl. ........................................ 385/128; 385/124
(58) Field of Classification Search ................ 385/128, 385/124; 11/11
See application file for complete search history.

(56) References Cited

U.S. PATENT DOCUMENTS

2002/0041746 A1   4/2002   Kato et al.

(Continued)

FOREIGN PATENT DOCUMENTS

CN        1302385 A1    7/2001

(Continued)

OTHER PUBLICATIONS

B-13-4, p-585, thesis titled as "Small Dispersion-Compensated Optical Fiber For Compensating Dispersion", 1999 General Conference, The Institute Of Electronics, Information And Communication Engineers, by Naoto Ogawa et al.

*Primary Examiner*—K. Cyrus Kianni
(74) *Attorney, Agent, or Firm*—Sughrue Mion, PLLC

(57) ABSTRACT

A dispersion-compensated optical fiber which does not cause an increase in a loss if it is wound in a small reel and has a stable temperature characteristics is provided, wherein, in a wavelength range from. A dispersion-compensated optical fiber is formed such that, in at least a wavelength between 1.53 to 1.63 μm, a bending loss of with a 20 mm bending diameter is 5 dB/m or lower, a wavelength dispersion is −120 ps/nm/km or lower, a cut-off wavelength under a usage condition is 1.53 μm or lower, an outer diameter of the cladding is 80 to 100 μm, an outer diameter of a coating is 160 to 200 μm, and a viscosity of a surface of a coating resin is 10 gf/mm or lower. It is set such that b/a is 1.5 to 3.5, c/b is 1.2 to 2.0, a radius of a core is 4 to 8 μm, Δ1 is +1.6% to +2.6%, Δ2 is −0.30% to −1.4%, and Δ3 is −0.30% to +1.0%. Young's modulus of a first coating layer is 0.15 kgf/mm2 or lower and its thickness is 20 to 30 μm. Young's modulus of a second coating layer is 50 kgf/mm2 or lower and its thickness is 15 to 30 μm.

8 Claims, 10 Drawing Sheets

U.S. PATENT DOCUMENTS

2005/0069269 A1* 3/2005 Libori et al. ................ 385/125

FOREIGN PATENT DOCUMENTS

| | | | |
|---|---|---|---|
| CN | 1323405 | A | 11/2001 |
| EP | 1063542 | A1 | 12/2000 |
| EP | 1 107 028 | A1 | 6/2001 |
| EP | 1107028 | A1 | 6/2001 |
| EP | 1 122 562 | A1 | 8/2001 |
| EP | 1 130 428 | A1 | 9/2001 |
| EP | 1130428 | A1 | 9/2001 |
| EP | 1217399 | A1 | 6/2002 |
| EP | 1246380 | A2 | 10/2002 |
| EP | 1 271 196 | A2 | 1/2003 |
| EP | 1271196 | A2 | 1/2003 |
| FR | EP1217399 | * | 6/2006 |
| JP | 5-203847 | A | 8/1993 |
| JP | 10-31120 | A | 8/1993 |
| JP | 5-281341 | A | 10/1993 |
| JP | 5-281431 | A | 10/1993 |
| JP | 6-11620 | A | 1/1994 |
| JP | 8-36123 | A | 2/1996 |
| JP | 8-54546 | A | 2/1996 |
| JP | 8-136758 | A | 5/1996 |
| JP | 10-31120 | A | 2/1998 |
| JP | 10-115725 | A | 5/1998 |
| JP | 10-115727 | A | 5/1998 |
| JP | 10-123342 | A | 5/1998 |
| JP | 10-319266 | A | 12/1998 |
| JP | 10319266 | * | 12/1998 |
| JP | 11-95056 | A | 4/1999 |
| JP | 2003-4995 | A | 1/2003 |
| JP | EP1107028 | * | 6/2006 |
| JP | EP1130428 | * | 9/2006 |
| WO | WO 97/46495 | A1 | 12/1997 |
| WO | WO 00/17684 | A1 | 3/2000 |
| WO | WO 00/17685 | A1 | 3/2000 |
| WO | WO 00/70378 | A1 | 11/2000 |

* cited by examiner

DISPERSION COMPENSATING OPTICAL FIBER

This is a National Stage entry of International Application PCT/JP03/03004, with an international filing date of Mar. 13, 2003, which was published under PCT Article 21(2) in Japanese, and the disclosure of which is incorporated herein by reference. Further, International Application PCT/JP03/03004 is based on Japanese Patent Application Nos. 2002-069077 and 2003-057013, filed in Japan on Mar. 13, 2002 and Mar. 4, 2003, respectively, the disclosures of which are incorporated herein by reference.

TECHNICAL FIELD

The present invention relates to a dispersion-compensated optical fiber which compensates a wavelength dispersion for a 1.3 µm bandwidth zero-dispersion single mode optical fiber (Standard Single Mode Fiber, hereinafter called an "S-SMF" for short) which has a zero-dispersion wavelength in 1.3 µm bandwidth or a non-zero dispersion shift optical fiber (Non-Zero Dispersion Shifted Fiber, hereinafter called as "NZ-DSF" for short. In particular, the present invention relates to a dispersion-compensated optical fiber in which there are few deterioration in characteristics even if it is formed to be a module by winding in a small reel.

BACKGROUND ART

In general, if a transmission distance for an optical fiber transmission path is formed to be long, a transmission speed is made to be high, and a number of a wavelength multiplication increases, there are a problem such as a transmission loss, an accumulated wavelength dispersion, and a polarization mode dispersion (Polarization Mode Dispersion, hereinafter called as "PMD" for short). It is possible to compensate the transmission loss by realizing an erbium-doped optical fiber amplifier. Next problem is an accumulated wavelength dispersion. A relationship between a transmission speed and an allowable wavelength dispersion is shown in FIG. 3. It is possible to compensate this accumulated wavelength dispersion by a module in which a dispersion-compensated optical fiber, etc. is used.

By the way, the S-SMF is commonly used all over the world presently. If a transmission for 1.55 µm bandwidth is performed by using this optical fiber network, a wavelength dispersion of approximately +17 ps/nm/km is generated in this 1.55 µm bandwidth. Therefore, if a signal is transmitted by using this optical fiber, the transmission characteristics deteriorates greatly by an influence of the accumulated wavelength dispersion in a long distance transmission. Also, although an NZ-DSF which has a smaller wavelength dispersion in 1.55 µm bandwidth than in the S-SMF is installed mainly for a long distance transmission path, it is necessary to compensate the wavelength dispersion which is accumulated on the transmission path.

Furthermore, at present, a wavelength multiplication transmission (Wavelength Division Multiplexing, hereinafter called as "WDM" for short) has been developed along with an increase in a transmission capacity; thus, the WDM transmission has already been realized practically in a lot of transmission paths. It is necessary to reduce the wavelength dispersion which is allowable over an entire wavelength bandwidth which is used in the WDM transmission. Therefore, it is necessary to compensate not only the wavelength dispersion but also a dispersion slope. A transmission optical fiber, a dispersion-compensated optical fiber, and a remaining dispersion characteristics after compensating the dispersion are shown in FIG. 4. A code for a dispersion slope of the dispersion-compensated optical fiber is opposite to a code for a dispersion slope for a transmission optical fiber, there is a case in which a remaining dispersion may be small in a wide range of bandwidth. An RDS is named for an index for indicating a performance for compensating this dispersion slope. The RDS (RDS; Relative Dispersion Slope) is a ratio of a dispersion slope with reference to the wavelength dispersion. RDS can be shown in a following formula (1) under condition that D indicates the wavelength dispersion and S indicates the dispersion slope.

$$RDS = S/D \qquad (1)$$

In order to reduce the remaining dispersion in a wide range of bandwidth, it is necessary to adapt a value which has an opposite code of a dispersion against the wavelength dispersion of the transmission optical fiber such that the RDS is as close as possible.

For such a dispersion-compensated optical fiber, for example, Japanese Unexamined Patent Application, First Publication No. Hei 6-11620 discloses a technology for a dispersion-compensated optical fiber which has a wavelength dispersion which is −20 ps/nm/km or lower for compensating the wavelength dispersion in 1.55 µm bandwidth in a standard single mode optical fiber which has a zero-dispersion wavelength in the wavelength 1.3 µm bandwidth. Also, Japanese Unexamined Patent Application, First Publication No. 11-95056 discloses a technology for a dispersion-compensated optical fiber in which a dispersion slope is reduce while reducing a connection loss such that an absolute value for the wavelength dispersion per a unit length is increased.

Also, Japanese Unexamined Patent Application, First Publication No. Hei 8-136758 discloses a technology for a dispersion-compensated optical fiber in which the dispersion slope is minus such that the wavelength dispersion is −100 ps/n/km or lower.

On the other hand, Japanese Unexamined Patent Application, First Publication No. Hei 8-54546 discloses a small-diameter dispersion-compensated optical fiber which has a first coating layer of which Young's modulus is 0.1 kgf/mm² on an outer periphery of an optical fiber naked line (cladding) of which outer diameter is smaller than 125 µm and has a second coating layer of which Young's modulus is 150 kgf/mm² or greater on an outer periphery of the first coating layer in an optical fiber which has a coating structure shown in FIG. 2. In a sixth embodiment of this Japanese Unexamined Patent Application, First Publication No. Hei 8-54546, a small-diameter dispersion-compensated optical fiber is disclosed which has 60 µm cladding, 160 µm coating, and −80.0 ps/nm/km.

Also, Japanese Unexamined Patent Application, First Publication No. Hei 10-115725 discloses a technology for a dispersion-compensated optical fiber which is connected to an optical fiber which has a wavelength dispersion in a transmission wavelength and compensates the above explained wavelength dispersion so as substantially to nullify the wavelength dispersion in an entire transmission system in the transmission wavelength. Also, Japanese Unexamined Patent Application, First Publication No. Hei 10-115725 discloses a technology for a dispersion-compensated optical fiber for reducing the wavelength dispersion in an entire transmission system in the transmission wavelength as close as zero which has a multi-layer structure such as at least two layers or more which comprises a core which is formed by a silica glass, a cladding which is formed by a silica glass on an outer periphery of the core, and a coating layer which is formed by a plastic resin member on an outer periphery of the cladding such that an outer diameter is smaller than 250 µm, the coating layer has 20 µm thickness or greater, and an outer layer which has a Young's modulus which is higher than that of an inner layer. A small-diameter dispersion-compensated optical fiber is disclosed in this Japanese Unexamined Patent Application, First Publication No. Hei 10-115725 and in embodiments in a specification of U.S. Pat. No. 5,887,104 such that a diameter of an outer cladding is 60 µm to 125 µm, an outer diameter of coating is 110 µm to 250 µm, and the wavelength dispersion is approximately −105 ps/nm/km.

Also, it is reported, in a B-13-4, p-585, thesis titled as "Small Dispersion-Compensated Optical Fiber For Compensating Dispersion", 1999 General Conference, The Institute Of Electronics, Information And Communication Engineers, by Naoto Ogawa et al, that there is not a problem with regards to an increase in the loss due to a side pressure and rigidity point of view if a proto-type for a small-diameter dispersion-compensated optical fiber is produced in which a wavelength dispersion is −102 ps/nm/km to −110 ps/nm/km, an outer diameter of a cladding is 90 µm to 125 µm, and an outer diameter of coating layer is 150 µm to 185 µm.

Such a dispersion-compensated optical fiber is formed to be a module by disposing in a casing for winding a coil of which length is ⅕ to ⅐ of the transmission optical fiber. Although, when an accumulated dispersion in the transmission optical fiber of which length is approximately 120 km is compensated by a module of a dispersion-compensated optical fiber, a necessary length for the dispersion-compensated optical fiber is approximately 20 km; thus, it is necessary to wind a very long dispersion-compensated optical fiber.

However, it is preferable that a size of the module should be constant with regardless to a necessary amount of for compensating the dispersion. Even if an absolute amount of the dispersion which is compensated is great, it is necessary to wind the dispersion-compensated optical fiber as long as possible in a small casing. Furthermore, it is preferable that this module for the dispersion-compensated optical fiber should be as small as possible so as to form a small transmission device.

A volume of the module depends on a volume for winding the dispersion-compensated optical fiber. Such a winding volume is indicated by a product for a cross sectional area which includes a coating and a spiral length of the dispersion-compensated optical fiber.

Therefore, it is effective if dispersion-compensated optical fiber is formed such that its diameter should be as small as possible for forming a small module as disclosed in the Japanese Unexamined Patent Application, First Publication No. Hei 8-54546, Japanese Unexamined Patent Application, First Publication No. Hei 10-115725, or U.S. Pat. No. 5,887,104.

The development for the dispersion-compensated optical fiber has been made such that an absolute value for the wavelength dispersion per a unit length unless the transmission loss is deteriorated, and an optical characteristic and reliability are not deteriorated; thus, the diameter of the optical fiber should be as small as possible in an allowable range. However, the technology which are disclosed in the above mentioned publication and a report by an institute was not sufficient for realizing a small module while restricting an increase of a loss which is caused by a bending loss over an entire range of the usage wavelength.

DISCLOSURE OF THE INVENTION

The present invention was made for solving the above mentioned problems. The present invention was invented so as to realize an stable temperature characteristics with a low loss and a low PMD in a dispersion-compensated optical fiber such that a volume ratio should be less than a half with reference to a module of the conventional dispersion-compensated optical fiber. An object of the present invention is to provide a dispersion-compensated optical fiber such that a fluctuation of a module loss should be within ±0.5 dB in a temperature range (−5° C. to 70° C.) which is used ordinarily even if a module of the dispersion-compensated optical fiber is produced.

In order to solve the above problems, a first aspect of the present invention is a dispersion-compensated optical fiber in which, in at least a wavelength which is selected from 1.53 µm to 1.63 µm, a bending loss is 5 dB/m or lower when it is wound by a 20 mm bending diameter, a wavelength dispersion is −120 ps/nm/km or lower, an absolute value of the wavelength dispersion per a unit loss is 200 ps/nm/dB or higher, a cut-off wavelength for used length and used condition is 1.53 µm or lower, an outer diameter of a cladding is 80 µm to 100 µm, an outer diameter of coating is 160 µm to 200 µm, and a viscosity of a surface of a coating resin is 10 gf/mm or lower.

By doing this, it is possible to realize a dispersion-compensated optical fiber in which, even if it is wound in a small reel, a module loss is low, there is not an increase of a loss which is caused by a bending loss, there is not an outstanding increase of a loss which is caused by a bending loss in a long wavelength. Thus, it is possible to contain the dispersion-compensated optical fiber in a smaller module with reference to a conventional module of the dispersion-compensated optical fiber. Even if a module for a dispersion-compensated optical fiber by winding it in a small coil, it is possible to realize a module for the dispersion-compensated optical fiber which has a stable temperature characteristics such that a fluctuation of the module loss is ±0.5 dB or lower in an ordinary usage temperature range (−5° C. to +70° C.).

Here, a viscosity is defined as an index for a rigidity for attaching optical fibers. For example, it is measured such that an optical fiber naked wire which is wound in a plurality of times under an overlapped condition on a sending roll is wound by a constant tension and a tension which is applied on the optical fiber naked wire is measured when it is wound.

A second aspect of the present invention is a dispersion-compensated optical fiber in which the viscosity of the surface of the coating resin of the dispersion-compensated optical fiber is 1 gf/mm or lower.

By doing this, it is possible to realize a dispersion-compensated optical fiber which has a further stable loss characteristics to a temperature fluctuation therearound.

A third aspect of the present invention is a dispersion-compensated optical fiber in which a Young's modulus of a first coating layer which is disposed on an outer periphery of the cladding is 0.15 kgf/mm$^2$, a thickness of the first coating layer is 20 μm to 30 μm, a Young's modulus of a second coating layer which is disposed on an outer periphery of the first coating layer is 50 kgf/mm$^2$, and a thickness of the second coating layer is 15 μm to 30 μm.

By doing this, it is possible to realize a dispersion-compensated optical fiber while maintaining a high reliability in which, even if it is wound in a small reel, a module loss due to the winding operation is low, in particular, there is not an outstanding increase of a loss which is caused by a micro bend characteristics in a long wavelength. Thus, it is possible to contain the dispersion-compensated optical fiber in a smaller module with reference to a conventional module of the dispersion-compensated optical fiber.

A fourth aspect of the present invention is a dispersion-compensated optical fiber which comprises at least a core and a cladding which is disposed on an outer periphery of the core. In this aspect of the present invention, a refractive index difference of the center core section with reference to the cladding is +1.6% to +2.6%, a refractive index difference of the intermediate core section with reference to the cladding is −0.30% to −1.4%; a refractive index difference of the ring core section with reference to the cladding is +0.30% to +1.0%; a ratio of a radius of the intermediate core section with reference to a radius of the center core section is 1.5 to 3.5; a ratio of a radius of the intermediate core section with reference to a radius of the ring core section is 1.2 to 2.0, and a radius of the core is 4 μm to 8 μm.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber.

Here, even if refractive index differences in each of these layers, a ratio of a radius of an intermediate core section with reference to a radius of the center core section, and a ratio of a radius of the ring core section with reference to the radius of the intermediate core section are within these ranges, it is not certain whether or not it is possible to obtain the dispersion-compensated optical fiber of the present invention. From this point of view, in the present invention, it is intended to specify a structural parameter and a characteristic value of the dispersion-compensated optical fiber.

A fifth aspect of the present invention is a dispersion-compensated optical fiber which comprises at least a core which is formed at least the center core section and the intermediate core section, and a cladding, such that a refractive index difference of the center core section with reference to the cladding is +1.6% to +2.6%; a refractive index difference of the intermediate core section with reference to the cladding is −0.30% to −1.4%; a ratio of a radius of the intermediate core section with reference to a radius of the center core section is 1.5 to 3.5; a ratio of a radius of the intermediate core section with reference to a radius of the ring core section is 1.2 to 2.0, and a radius of the core is 4 μm to 8 μm.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber.

Here, even if refractive index differences in each of these layers, and a ratio of a radius of an intermediate core section with reference to a radius of the center core section are within these ranges, it is not certain whether or not it is possible to obtain the dispersion-compensated optical fiber of the present invention. From this point of view, in the present invention, it is intended to specify a structural parameter and a characteristic value of the dispersion-compensated optical fiber.

In a sixth aspect of the present invention, in at least a wavelength which is selected from 1.53 μm to 1.57 μm, a quotient which is obtained by dividing the dispersion slope by the wavelength dispersion is 0.0026 nm$^{-1}$ to 0.010 nm$^{-1}$.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber. Compatibly, the RDS in 1.53 μm to 1.57 μm is 0.0026 nm$^{-1}$ to 0.010 nm$^{-1}$, it is possible to realize a dispersion-compensated optical fiber which is suitable for the S-SMF which has an RDS typically such as 0.0034 nm$^{-1}$ in 1.55 μm and an NZ-DSF which has a typical RDS such as 0.007 nm$^{-1}$ to 0.010 nm$^{-1}$.

In a seventh aspect of the present invention, in at least a wavelength which is selected from 1.53 μm to 1.57 μm, a quotient which is obtained by dividing the dispersion slope by the wavelength dispersion is 0.0026 nm$^{-1}$ to 0.041 nm$^{-1}$.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber. Compatibly, the RDS is 0.0026 nm$^{-1}$ to 0.041 nm$^{-1}$; thus, is it possible to realize a dispersion-compensated optical fiber which is suitable for the S-SMF which has typically an RDS such as 0.0034 nm$^{-1}$.

In an eighth aspect of the present invention, in at least a wavelength which is selected from 1.57 μm to 1.63 μm, a quotient which is obtained by dividing the dispersion slope by the wavelength dispersion is 0.0022 nm$^{-1}$ to 0.010 nm$^{-1}$.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber. Compatibly, the RDS in 1.57 μm to 1.63 μm is 0.0022 nm$^{-1}$ to 0.010 nm$^{-1}$, it is possible to realize a dispersion-compensated optical fiber which is suitable for the S-SMF which has an RDS typically such as 0.0029 nm$^{-1}$ in 1.59 μm and an NZ-DSF which has a typical RDS such as 0.005 nm$^{-1}$ to 0.010 nm$^{-1}$.

In a ninth aspect of the present invention, in at least a wavelength which is selected from 1.57 μm to 1.63 μm, a quotient which is obtained by dividing the dispersion slope by the wavelength dispersion is 0.0022 nm$^{-1}$ to 0.035 nm$^{-1}$.

By doing this, it is possible to realize a dispersion-compensated optical fiber in which, even if it is wound in a small reel, a module loss is low, there is not an outstanding increase of a loss which is caused by a bending loss in a long wavelength. Thus, it is possible to contain the dispersion-compensated optical fiber in a smaller module with reference to a conventional module of the dispersion-compensated optical fiber. Compatibly, the RDS is 0.0026 nm$^{-1}$ to 0.035 nm$^{-1}$ in 1.57 μm to 1.63 μm; thus, is it possible to realize a dispersion-compensated optical fiber which is suitable for the S-SMF which has typically an RDS such as 0.0029 nm$^{-1}$ in 1.59 μm.

BRIEF DESCRIPTION OF DRAWINGS

These and other features, aspects, and advantages of the present invention will become better understood with reference to the following description and accompanying drawings, which should not be read to limit the invention in any way, in which.

BEST MODE FOR CARRYING OUT THE INVENTION

The present invention is explained in detail as follows.

Figure 1A:
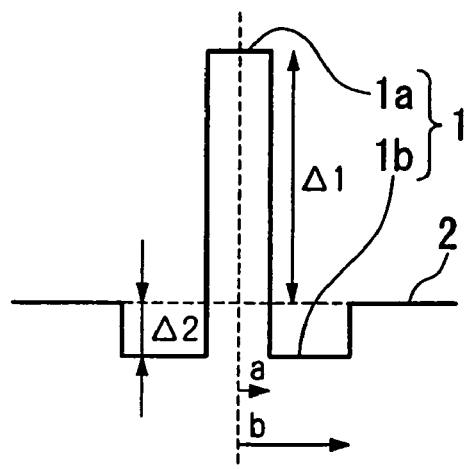
FIGS. 1A, 1B, and 1C are views for showing an example for refractive index distribution of the dispersion-compensated optical fiber according to the present invention.

An example for a refractive index distribution of the dispersion-compensated optical fiber according to the present invention is shown in FIGS. 1(a), (b), (c).

In FIGS. 1(a), (b), reference numeral 1a indicates a center core section. Reference numeral 1b indicates an intermediate core section which is disposed on an outer periphery of the center core section 1a. Reference numeral 2 indicates a cladding which is disposed on an outer periphery of the intermediate core section 1b. Also, in FIG. 1(c), reference numeral 1a indicates a center core section. Reference numeral 1b indicates an intermediate core section which is disposed on an outer periphery of the center core section 1a. Reference numeral 1c indicates cladding which is disposed on an outer periphery of the intermediate core section 1b. Reference numeral 2 indicates cladding which is disposed on an outer periphery of the ring core section 1c.

In FIGS. 1(a), (b), reference numeral 1a indicates a center core section. Reference numeral 1b indicates an intermediate core section which is disposed on an outer periphery of the center core section 1a. Reference numeral 2 indicates a cladding which is disposed on an outer periphery of the intermediate core section 1b. Also, in FIG. 1(c), reference numeral 1a indicates a center core section. Reference numeral 1b indicates an intermediate core section which is disposed on an outer periphery of the center core section 1a. Reference numeral 1c indicates a ring core section which is disposed on an outer periphery of the intermediate core section 1b. Reference numeral 2 indicates cladding which is disposed on an outer periphery of the ring core section 1c.

The center core section 1a has a refractive index which is greater than the refractive index of the cladding 2. The intermediate core section 1b has a refractive index which is smaller than the refractive index of the cladding 2. The ring core section 1c has a refractive index which is greater than the refractive index of the cladding 2.

In a first example for the dispersion-compensated optical fiber according to the present invention, a ratio b/a of the radius of the intermediate core section with reference to the radius of the center core section is 1.5 to 3.5, a ratio c/b of the radius of the ring core section with reference to the radius of the intermediate core section is 1.2 to 2.0, a radius of the core is 4 µm to 8 µm, a refractive index difference Δ1 of the center core section 1a with reference to the cladding 2 is +1.6% to +2.6%, a refractive index difference Δ2 of the intermediate core section 1b with reference to the cladding 2 is −0.30% to −1.4%, and a refractive index difference Δ3 of the ring core section 1c with reference to the cladding 2 is −±0.30% to +1.0%.

Also, the dispersion-compensated optical fiber in this example is specified by specific values below in addition to these structures. Such specific values are such that, in at least a wavelength which is selected from 1.53 µm to 1.63 µm, a bending loss is 5 dB/m or lower when it is wound by a 20 mm bending diameter, a wavelength dispersion is −120 ps/nm/km or lower, an absolute value of the wavelength dispersion per a unit loss is 200 ps/nm/dB or higher, a cut-off wavelength for used length and used condition is 1.53 µm or lower, an outer diameter of a cladding is 80 µm to 100 µm, an outer diameter of coating is 160 µm to 200 µm, and a viscosity of a surface of a coating resin is 10 gf/mm or lower, more preferably 1 gf/mm or lower. Here, the wavelength dispersion is in a range in which it is possible to realize approximately −300 ps/nm/km or greater from a view point of a range for controlling a refractive index difference and a bending loss. An absolute value for the wavelength dispersion per a unit loss is in a range in which it is possible to realize approximately 500 ps/nm/dB from a view point of a value of the transmission loss.

Figure 2:
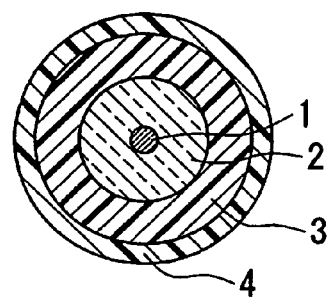
FIG. 2 is a cross section for showing a structure for a coating layer of the dispersion-compensated optical fiber of the present invention.
Figure 3:
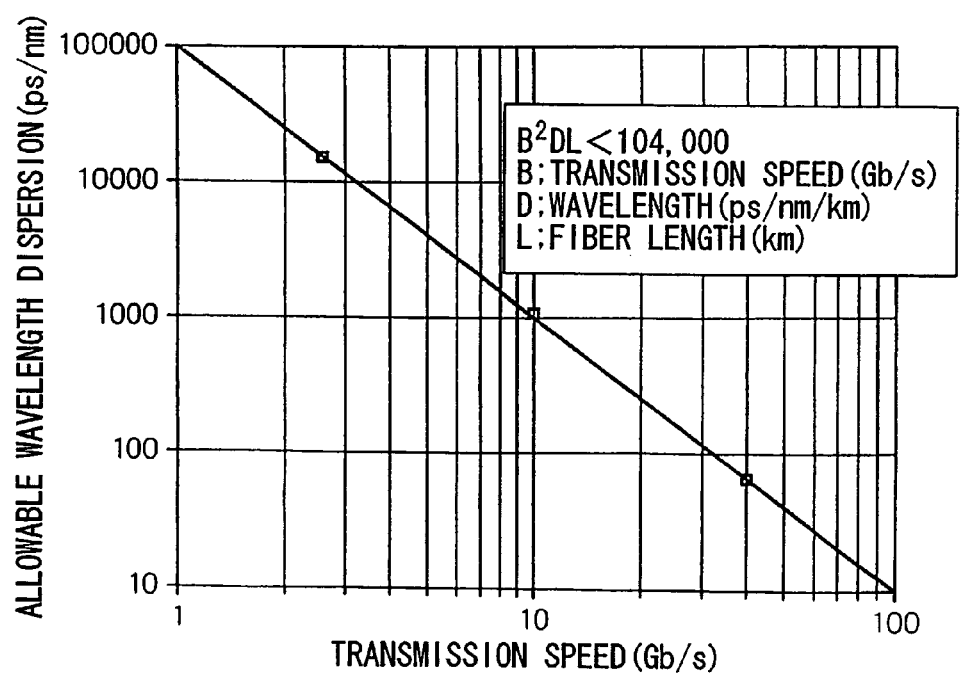
FIG. 3 is a graph for showing a conventional relationship for a transmission speed and an allowable wavelength dispersion.
Figure 4:
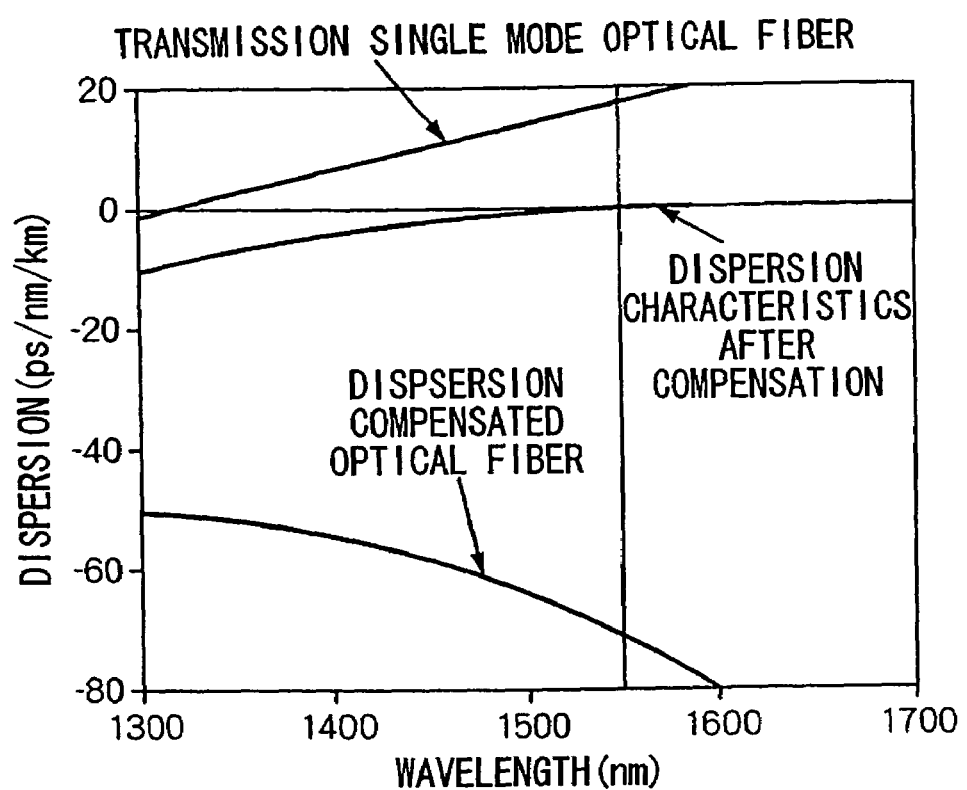
FIG. 4 is a graph which shows a transmission optical fiber, a dispersion-compensated optical fiber, and a remaining dispersion characteristic after compensating the dispersion.

A structure of a coating layer of this dispersion-compensated optical fiber is shown in FIG. 2.

In FIG. 2, reference numeral 1 indicates a core. Reference numeral 2 indicates a cladding which is formed around the core 1. A first coating layer 3 is formed on an outer periphery of the cladding 2. A second coating layer 4 is formed on an outer periphery of the first coating layer 3. It is preferable that the Young's modulus of the first coating layer should be 0.15 kgf/mm² or lower. Also, it is preferable that the Young's modulus of the second coating layer should be 50 kgf/mm² or greater.

A main role for each of the coating layer is such that the first coating layer serves for a shock-absorbing member so as to contact a surface of a glass member and the second coating layer serves for maintaining a rigidity for an optical fiber. Therefore, it is preferable if both the first coating layer and the second coating layer are thick. However, if both of them are thick, it is not possible to realize a purpose for providing a small module for a dispersion-compensated optical fiber by forming the dispersion-compensated optical fiber in a small radius. Also, if the Young's modulus of the first coating layer exceeds 0.15 kgf/mm², an external influence disturbs the optical fiber directly. Consequently, a micro-bend loss, etc. is generated; thus, a transmission loss is deteriorated. Furthermore, is the Young's modulus of the second coating layer is less than 50 kgf/mm², it is not possible to maintain the rigidity of the optical fiber. These values relates to thickness of each layer. It is preferable that the thickness of the first coating layer is 20 µm to 30 µm, and the thickness of the second coating layer is 15 µm to 30 µm. Therefore, the relationship between these is shown in formulae (2), (3). It is preferable to use a resin of which Young's modulus satisfies conditions in these formulae from a fiber rigidity point of view.

$$0.06 \times 10^{-3} \leq S_1 \times E_1 \leq 1.3 \times 10^{-3} \quad (2)$$

$$0.3 \leq S_2 \times E_2 \leq 3.0 \quad (3)$$

Here, $S_1$ indicates a cross sectional area [mm²] for the first coating layer. $E_1$ indicates a Young's modulus [kgf/mm²] in the first coating layer. $S_2$ indicates a cross sectional area [mm²] of the second coating layer. $E_2$ indicates a Young's modulus [kgf/mm²] in the second coating layer.

In this dispersion-compensated optical fiber, it is preferable that an outer diameter of the cladding 2 is 80 µm to 100 µm, and an outer diameter of a coating which is formed by the first coating layer 3 and the second coating layer 4 is 160 µm to 200 µm.

If an outer diameter of the cladding 2 exceeds 100 µm so as to secure a necessary coating thickness, an outer diameter of coating is inevitably greater; thus, such a condition cannot be consistent with a purpose for providing a small module. On the other hand, if an outer diameter of the cladding 2 is smaller than 80 µm, the cladding thickness is too thin; thus, it is vulnerable to an influence of a micro-bend, etc.; thus, a loss characteristics is deteriorated. Although it is possible to reduce such an influence by increasing the coating thickness, it is necessary to reduce a characteristics such as a bending loss, etc. as long as it is smaller than 80 µm Therefore, it is preferable that the outer diameter of the cladding 2 should be 80 µm or greater.

Also, it is possible to form a short fiber by increasing an absolute value for the dispersion; thus, it is possible to realize a smaller module. If an outer diameter of a coating which is formed by the first coating layer 3 and the second coating layer 4 exceeds 200 µm, such an effect is not so great. On the other hand, if the outer diameter of the coating is smaller than 160 µm, the thickness of the first coating layer and the thickness of the second coating layer are too thin; thus, it may be more feasible that it will be disturbed by a micro-bend, etc., or a deterioration of a rigidity in an optical fiber itself may occur.

Also, if a module for a dispersion-compensated optical fiber is produced by winding a dispersion-compensated optical fiber of which diameter is formed to be small, a temperature characteristics for the module loss is deteriorated because of the surface viscosity. It is possible to realize a module for a dispersion-compensated optical fiber which has a stable temperature characteristics such as a ±0.5 dB or smaller fluctuation of the modules loss in an ordinary temperature range (−5° C. to +70° C.) by forming the surface viscosity to be 10 gf/mm or smaller, more preferably 1 gf/mm or smaller even if a module for a dispersion-compensated optical fiber is produced by winding it on a small coil.

For a method for reducing such a viscosity, methods can be named such as using an ultraviolet-ray-curable resin which contains 1 to 5 wt % of silicon component or forming the ultraviolet-ray-curable resin so as to have an 2% or lower atmospheric oxygen density which is more preferably 0%.

By doing this, it is possible to realize a dispersion-compensated optical fiber which can be contained in a small module in which a module loss is low and there is not an outstanding increase in a loss in a long wavelength which is caused by the bending loss and the micro-bend characteristics with compared to a conventional module for a dispersion-compensated optical fiber even if it is wound in a small reel. It is possible to realize a module for a dispersion-compensated optical fiber which has a stable temperature characteristics such as a ±0.5 dB or smaller fluctuation of the module loss in an ordinary temperature range (−5° C. to +70° C.).

A second example for a dispersion-compensated optical fiber according to the present invention is formed such that, in a W-type refractive index profile as shown in FIGS. 1(a), (b), a ratio b/a of a radius of the intermediate core section with reference to the radius of the center core section is 1.5 to 3.5, a radius of the core is 4 μm to 8 μm, a relative refractive index difference Δ1 of the center core section 1a with reference to the cladding 2 is +1.6% to +2.6%, a relative refractive index difference Δ2 of the intermediate core section 1b with reference to the cladding 2 is −0.30% to −1.4%.

Also, the dispersion-compensated optical fiber in this example is specified by specific values below in addition to these structures. Such specific values are such that, in at least a wavelength which is selected from 1.53 μm to 1.63 μm, a bending loss is 5 dB/m or lower when it is wound by a 20 mm bending diameter, a wavelength dispersion is −120 ps/nm/km or lower, an absolute value of the wavelength dispersion per a unit loss is 200 ps/nm/dB or higher, a cut-off wavelength for used length and used condition is 1.53 μm or lower, an outer diameter of a cladding is 80 μm to 100 μm, an outer diameter of coating is 160 μm to 200 μm, and a viscosity of a surface of a coating resin is 10 gf/mm or lower, more preferably 1 gf/mm or lower.

By doing this, it is possible to realize a dispersion-compensated optical fiber which can be contained in a small module in which a module loss is low and there is not an outstanding increase in a loss in a long wavelength which is caused by the bending loss and the micro-bend characteristics with compared to a conventional module for a dispersion-compensated optical fiber even if it is wound in a small reel.

Regarding a PMD, it is preferable to be 0.3 ps/√km in any one of the above explained first and the second example. More preferably, it is 0.2 ps/√km.

A PMD is a dispersion which is caused because a degeneracy is released by forming a core of a single mode optical fiber in an oval shape; thus, a group delay difference is generated between a two orthogonal polarization modes. Therefore, the PMD has not been a big problem because it has been possible to ignore the PMD in a conventional communication speed. However, the PMD is a factor for a cause of a transmission characteristics deterioration in a large-capacity optical communication system. A limitation for a transmission distance for the PMD can be represented by a formula (4) below.

$$B \cdot PMD \cdot \sqrt{L} < 100 \qquad (4)$$

Here, B indicates a transmission speed [Gb/s]. PMD indicates a polarization mode dispersion [ps/√km]. L indicates a fiber length [km]. Although a required value for the PMD is different according to the transmission speed and the transmission distance, it is necessary to maintain the PMD in as low as possible if a future upgrading operation (for example, an enhancement for the transmission speed) is taken into account for a transmission system.

A third example for a dispersion-compensated optical fiber according to the present invention is formed such that, in a W-type refractive index profile as shown in FIGS. 1(a), (b), a ratio b/a of a radius of the intermediate core section with reference to the radius of the center core section is 1.5 to 3.5, a radius of the core is 4 μm to 8 μm, a relative refractive index difference Δ1 of the center core section 1a with reference to the cladding 2 is +1.6 % to +2.6%, a relative refractive index difference Δ2 of the intermediate core section 1b with reference to the cladding 2 is −0.30% to −1.4%. A third example for the dispersion-compensated optical fiber according to the present invention is formed such that, in a W-type profile with a ring which is shown in FIG. 1(c), a ratio b/a of the radius of the intermediate core section with reference to the radius of the center core section is 1.5 to 3.5, a ratio c/b of the raduis of the ring core section with reference to the radius of the intermediate core section is 1.2 to 2.0, a radius of the core is 4 μm to 8 μm, a refractive index difference Δ1 of the center core section 1a with reference to the cladding 2 is +1.6% to +2.6%, a refractive index difference Δ2 of the intermediate core section 1b with reference to the cladding 2 is −0.30% to −1.4%, and a refractive index difference Δ3 of the ring core section 1c with reference to the cladding 2 is +0.30% to +1.0% Also, the dispersion-compensated optical fiber in this example is specified by specific values below in addition to these structures. Such specific values are such that, in at least a wavelength which is selected from 1.53 μm to 57 μm, a bending loss is 5 dB/m or lower when it is wound by a 20 mm bending diameter, a wavelength dispersion is −120 ps/nm/km or lower, an absolute value of the wavelength dispersion per a unit loss is 200 ps/nm/dB or higher, a cut-off wavelength for used length and used condition is 1.53 μm or lower, a quotient which is obtained by dividing the dispersion slope by the wavelength dispersion is 0.0026 nm$^{-1}$ to 0.010 nm$^{-1}$, an outer diameter of a cladding is 80 μm to 100 μm, an outer diameter of coating is 160 μm to 200 μm.

By using such a dispersion-compensated optical fiber, it is possible to contain it in a small module with compared to a conventional module for a dispersion-compensated optical fiber in which a module loss is low and there is not an outstanding increase in a loss in a long wavelength which is caused by the bending loss and the micro-bend even if it is wound in a small reel. Typically, it is possible to realize a dispersion-compensated optical fiber which is suitable for the S-SMF which has an RDS typically such as 0.0034 nm$^{-1}$ in 1.55 μm and an NZ-DSF which has a typical RDS such as 0.007 nm$^{-1}$ to 0.010 nm$^{-1}$ in 1.55 μm bandwidth.

A fourth example for a dispersion-compensated optical fiber according to the present invention is formed such that, in a W-type refractive index profile as shown in FIGS. 1(a), (b), a ratio b/a of a radius of the intermediate core section with reference to the radius of the center core section is 1.5 to 3.5, a radius of the core is 4 μm to 8 μm, a relative refractive index difference Δ1 of the center core section 1a with reference to the cladding 2 is +1.6% to +2.6%, a relative refractive index difference Δ2 of the intermediate core section 1b with reference to the cladding 2 is −0.30% to −1.4%. Also, a fourth example for the dispersion-compensated optical fiber according to the present invention is formed such that, in a W-type profile with a ring which is shown in FIG. 1(c), a ratio b/a of the radius of the intermediate core section with reference to the radius of the center core section is 1.5 to 3.5, a ratio c/b of the radius of the ring core section with reference to the radius of the intermediate core section is 1.2 to 2.0, a radius of the core is 4 μm to 8 μm, a refractive index difference Δ1 of the center core section 1a with reference to the cladding 2 is +1.6% to +2.6%, a refractive index difference Δ2 of the intermediate core section 1b with reference to the cladding 2 is −0.30% to −1.4%, and a refractive index difference Δ3 of the ring core section 1c with reference to the cladding 2 is +0.30% to +1.0% Also, the dispersion-compensated optical fiber in this example is specified by specific values below in addition to these structures. Such specific values are such that, in at least a wavelength which is selected from 1.57 μm to 1.63 μm, a bending loss is 5 dB/m or lower when it is wound by a 20 mm bending diameter, a wavelength dispersion is −120 ps/nm/km or lower, an absolute value of the wavelength dispersion per a unit loss is 200 ps/nm/dB or higher, a cut-off wavelength for used length and used condition is 1.57 μm or lower, a quotient which is obtained by dividing the dispersion slope by the wavelength dispersion is 0.0022 nm$^{-1}$ to 0.010 nm$^{-1}$, an outer diameter of a cladding is 80 μm to 100 μm, an outer diameter of coating is 160 μm to 200 μm.

By using such a dispersion-compensated optical fiber, it is possible to contain it in a small module with compared to a conventional module for a dispersion-compensated optical fiber in which a module loss is low and there is not an outstanding increase in a loss in a long wavelength which is caused by the bending loss even if it is wound in a small reel. Compatibly, the RDS in 1.57 μm to 1.63 μm is 0.0022 nm$^{-1}$ to 0.010 nm$^{-1}$. Therefore, typically, it is possible to realize a dispersion-compensated optical fiber which is suitable for the S-SMF which has an RDS typically such as 0.0029 nm$^{-1}$ in 1.59 μm and an NZ-DSF which has a typical RDS such as 0.005 nm$^{-1}$ to 0.010 nm$^{-1}$ and a wavelength dispersion approximate several ps/nm/km in 1.59 μm bandwidth.

Also, it is possible to prevent a deterioration of the module loss due to the deformed winding operation and a deterioration of the PMD by forming a module for a dispersion-compensated optical fiber by winding the above explained dispersion-compensated optical fiber in a reel which has 90 mm of a minimum cylinder diameter at a winding tension between 30 g to 50 g. Also, it is possible to reduce the deterioration of the module loss due to the micro-bend; therefore, it is possible to realize a small module for a dispersion-compensated optical fiber which has a stable characteristics against a vibrating collision and a fluctuation of the temperature.

Hereinafter, specific examples are shown.

EXAMPLE 1

Figure 1B:
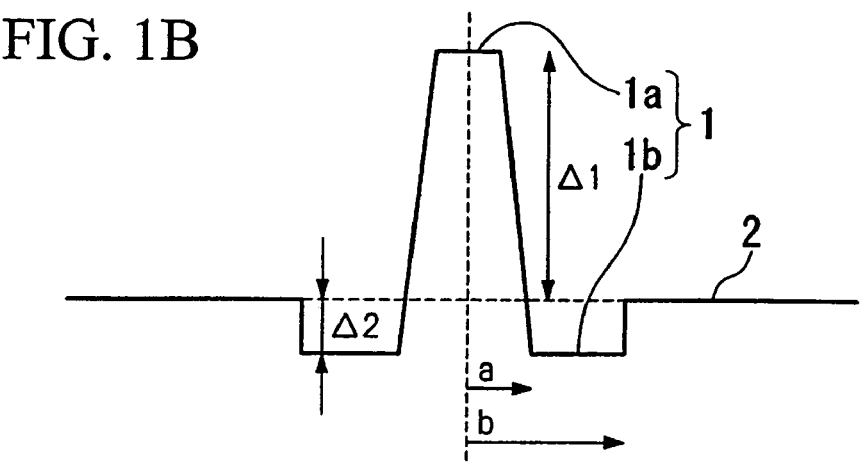
Figure 1C:
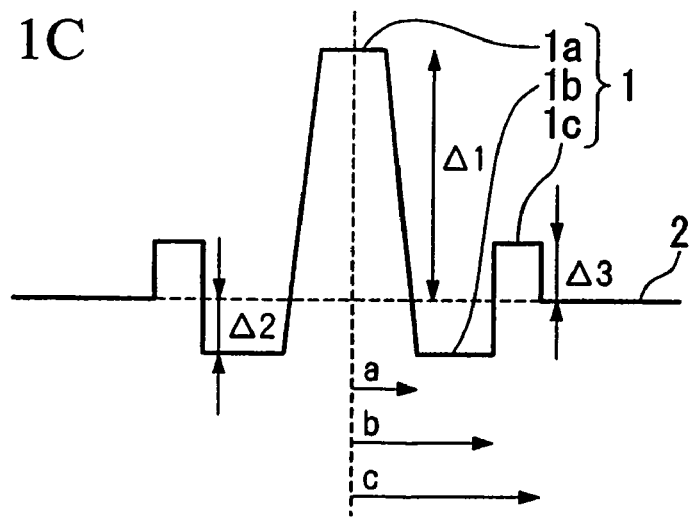

Dispersion-compensated optical fibers are produced with a W-type profile shown in FIG. 1(b) and a W-type profile with a ring shown in FIG. 1(c) according to a commonly known method such as a VAD method, an MCVD method, or a PCVD method. Under such a condition, values such as Δ1, Δ2, Δ3, b/a, c/b, a core radius, a diameter of the cladding, an outer diameter of a first coating layer, and an outer diameter of a second coating layer are made so as to be values shown in a TABLE 1 under condition that an atmospheric oxygen density should be 0.1% or lower (0.0% when it is displayed) when an ultraviolet-ray-curable resin is hardened while being drawn.

Here, a dispersion-compensated optical fiber in No. 1 is produced so as to have an outer diameter of the conventional cladding and a coating structure for a purpose of a comparison. The dispersion-compensated optical fibers shown in No. 2 to No. 6 are examples of the optical fiber according to the present invention.

TABLE 1

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER DIAMETER (μm) | SURFACE VISCOSITY (gf/mm) |
|---|---|---|---|---|---|---|---|---|---|---|
| 1 | 1.70 | −0.40 | 0.35 | 3.5 | 1.4 | 6.7 | 125 | 200 | 250 | 0.1 |
| 2 | 2.00 | −0.46 | 0.36 | 2.7 | 1.5 | 6.4 | 90 | 135 | 175 | 0.1 |
| 3 | 2.00 | −0.72 | 0.36 | 2.7 | 1.5 | 6.4 | 80 | 125 | 165 | 0.1 |
| 4 | 2.60 | −1.40 | — | 2.0 | — | 4.4 | 100 | 140 | 180 | 0.1 |

TABLE 1-continued

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 5 | 2.40 | −1.30 | — | 2.0 | — | 4.7 | 100 | 160 | 200 | 0.1 |
| 6 | 2.20 | −0.70 | — | 2.5 | — | 5.7 | 100 | 130 | 160 | 0.1 |

Optical characteristics for these dispersion-compensated optical fibers are shown in a TABLE 2.

In these dispersion-compensated optical fiber, values such as Δ1, Δ2, Δ3, b/a, c/b, and a core radius are set to be values shown in the TABLE 1. By doing this, it was possible to increase an absolute value of the wavelength dispersion per a unit length of an optical fiber and decrease the bending loss. Also, a first coating layer of which Young's modulus is 0.15 kgf/mm$^2$ or lower and a second coating layer of which Young's modulus is 50 kgf/mm$^2$ or higher are formed on an outer periphery of the cladding of which outer diameter is 80 μm to 100 μm.

The outer diameter of the coating of this dispersion-compensated optical fiber is as narrow as 160 μm to 200 μm; thus, it is possible to form a small module thereby. Also, an optical characteristics for a module of the dispersion-compensated optical fiber and module size are shown in TABLE 3 under condition that a module is formed by winding these dispersion-compensated optical fiber in a small reel of which cylinder diameter is 80 mm by 40 g of winding tension and connecting a 1.3 μm bandwidth zero-dispersion single mode optical fiber with connecters to both ends thereof. These modules for the dispersion-compensated optical fiber serve for S-SMF 100 km compensation.

TABLE 2

| No. | WAVELENGTH (μm) | TRANSMISSION LOSS (μm) | WAVELENGTH DISPERSION (ps/nm/km) | PERFORMANCE INDEX (ps/nm/dB) | PMD (ps/√km) | BENDING LOSS (dB/m) 2R = 20 mm |
|---|---|---|---|---|---|---|
| 1 | 1.55 | 0.35 | −91 | 260 | 0.08 | 0.4 |
| 2 | 1.55 | 0.45 | −120 | 267 | 0.08 | 1.0 |
| 3 | 1.55 | 0.52 | −148 | 285 | 0.08 | 0.2 |
| 4 | 1.55 | 0.65 | −214 | 329 | 0.22 | 1.0 |
| 5 | 1.55 | 0.62 | −157 | 253 | 0.12 | 0.8 |
| 6 | 1.55 | 0.50 | −147 | 294 | 0.08 | 3.3 |

TABLE 3

| No. | MODULE NO. | MODULE LOSS (dB) | MODULE DISPERSION (ps/nm) | CONTAINABLE MODULE SIZE (WIDTH × DEPTH × HEIGHT) (mm) | | | VOLUME RATIO* (%) |
|---|---|---|---|---|---|---|---|
| 1 | MODULE 1 | 8.0 | −1700 | 230 | 230 | 45 | — |
| 2 | MODULE 2 | 7.4 | −1710 | 215 | 215 | 21 | 41 |
| 3 | MODULE 3 | 6.8 | −1703 | 190 | 190 | 21 | 32 |
| 4 | MODULE 4 | 7.0 | −1650 | 170 | 170 | 21 | 25 |
| 5 | MODULE 5 | 6.9 | −1700 | 205 | 205 | 21 | 37 |
| 6 | MODULE 6 | 6.8 | −1703 | 178 | 178 | 21 | 28 |

*Volume ratio with reference to a module 1 in which a conventional dispersion compensated optical fiber is used.

According to the TABLE 3, it is understood that a dispersion-compensated optical fiber is realized in which a module loss is low, and there is not an increase in a loss which is caused by a bending loss even if it is wound in a small reel and it is possible to contain thereof in a small module of which volume ratio is 50% or lower with compared to a conventional module for a dispersion-compensated optical fiber.

EXAMPLE 2

Four variations of dispersion-compensated optical fibers with a W-type profile shown in FIG. 1(c) are produced according to a commonly known method such as a VAD method, an MCVD method, or a PCVD method. Under such a condition, values such as Δ1, Δ2, Δ3, b/a, c/b, and a core radius are made so as to be values shown in a TABLE 4 under condition that an atmospheric oxygen density should be 0.1% or lower (0.0% when it is displayed) when an ultraviolet-ray-curable resin is hardened while being drawn.

Here, a dispersion-compensated optical fibers in No. 7 to No. 9 are produced so as to have conventional dispersion characteristics for a purpose of a comparison. The dispersion-compensated optical fiber shown in No. 2 is an example of the optical fiber according to the present invention.

Optical characteristics for these dispersion-compensated optical fibers are shown in a TABLE 5.

In these dispersion-compensated optical fiber, values such as $\Delta 1$, $\Delta 2$, $\Delta 3$, b/a, c/b, and a core radius are set to be values shown in the TABLE 4. By doing this, values for the wavelength dispersion were varied without changing the bending loss. The outer diameter of the cladding, Young's modulus and thickness of the first coating layer, and Young's modulus and thickness of the second coating layer are the same.

A module is formed by winding these dispersion-compensated optical fiber in a small reel of which cylinder diameter is 80 mm by 40 g of winding tension and connecting a 1.3 μm bandwidth zero-dispersion single mode optical fiber with connecters to both ends thereof. The module dispersion is −1700 ps/nm which is equivalent for S-SMF 100 km compensation. Optical characteristics of the module of the dispersion-compensated optical fiber and the module size are shown in TABLE 6 when they are produced.

According to the TABLE 6, it is understood that a module for a dispersion-compensated optical fiber which uses a dispersion-compensated optical fiber No. 7 of which wavelength dispersion is −90 ps/nm/km has 47% of volume ratio with reference to a conventional module. Dispersion-compensated optical fiber No. 8 with −83 ps/nm/km and a dispersion-compensated optical fibers No. 8 and No. 9 which use a dispersion-compensated optical fiber No. 9 with −77 ps/nm/km have 50% of volume ratio or higher with reference to the conventional module; thus, it is understood that a smaller device is not realized sufficiently. According to these results, it is understood that it is necessary that the absolute value for the wavelength dispersion should be 120 ps/nm or higher (−120 ps/nm/km or lower) at least.

EXAMPLE 3

Five variations of dispersion-compensated optical fibers with a W-type profile shown in FIG. 1(b) or with a W-type profile with ring as shown in FIG. 1(c) are produced according to a commonly known method such as a VAD method, an MCVD method, or a PCVD method Under such a condition, values such as $\Delta 1$, $\Delta 2$, $\Delta 3$, b/a, c/b, a core radius, a diameter of the cladding, an outer diameter of a first coating layer, and an outer diameter of a second coating layer are made so as to be values shown in a TABLE 1 under

TABLE 4

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 2 | 2.00 | −0.46 | 0.36 | 2.7 | 1.5 | 6.4 | 90 | 135 | 175 | 0.1 |
| 7 | 1.60 | −0.35 | 0.30 | 2.7 | 1.5 | 5.3 | 90 | 135 | 175 | 0.1 |
| 8 | 1.60 | −0.30 | 0.30 | 2.7 | 1.5 | 5.2 | 90 | 135 | 175 | 0.1 |
| 9 | 1.50 | −0.30 | 0.30 | 2.7 | 1.5 | 5.6 | 90 | 135 | 175 | 0.1 |

TABLE 5

| No. | WAVELENGTH (μm) | TRANSMISSION LOSS (μm) | WAVELENGTH DISPERSION (ps/nm/km) | PERFORMANCE INDEX (ps/nm/dB) | PMD (ps/√km) | BENDING LOSS (dB/m) 2R = 20 mm |
|---|---|---|---|---|---|---|
| 2 | 1.55 | 0.45 | −120 | 267 | 0.08 | 1.0 |
| 7 | 1.55 | 0.42 | −90 | 214 | 0.07 | 5.0 |
| 8 | 1.55 | 0.38 | −83 | 218 | 0.12 | 2.8 |
| 9 | 1.55 | 0.33 | −77 | 233 | 0.15 | 1.1 |

TABLE 6

| No. | MODULE NO. | MODULE LOSS (dB) | MODULE DISPERSION (ps/nm) | CONTAINABLE MODULE SIZE (WIDTH × DEPTH × HEIGHT) (mm) | VOLUME RATIO* (%) |
|---|---|---|---|---|---|
| 2 | MODULE 2 | 7.4 | −1700 | 205  205  21 | 37 |
| 7 | MODULE 7 | 8.9 | −1700 | 230  230  21 | 47 |
| 8 | MODULE 8 | 8.8 | −1700 | 240  240  21 | 51 |
| 9 | MODULE 9 | 8.3 | −1700 | 245  245  21 | 53 |

*Volume ratio with reference to a module 1 in which a conventional dispersion compensated optical fiber is used.

condition that an atmospheric oxygen density should be 0.1% or lower (0.0% when it is displayed) when an ultra-violet-ray-curable resin is hardened while being drawn.

Here, a dispersion-compensated optical fibers in No. 12 to No. 13 are produced so as to have conventional dispersion characteristics for a purpose of a comparison. The dispersion-compensated optical fiber shown in No. 2, No. 10, and No. 11 are examples of the optical fiber according to the present invention.

condition that a module is formed by winding these dispersion-compensated optical fiber in a small reel of which cylinder diameter is 80 mm by 40 g of winding tension and connecting a 1.3 µm bandwidth zero-dispersion single mode optical fiber with connecters to both ends thereof.

Figure 5:
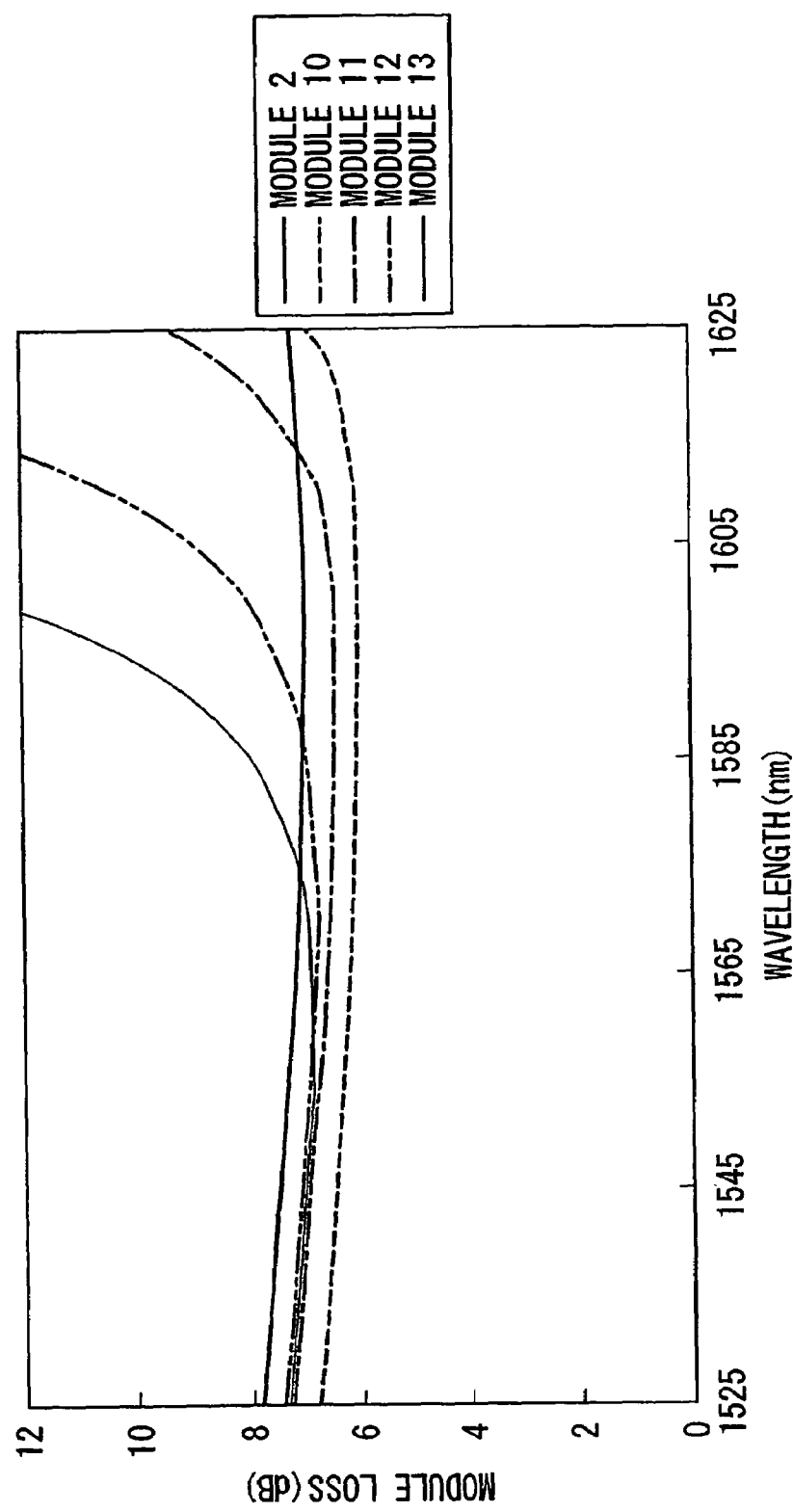
FIG. 5 is a graph for showing a loss wavelength characteristics for a module of a dispersion-compensated optical fiber which uses a dispersion-compensated optical fiber in which a bending loss is varied.
Figure 6:
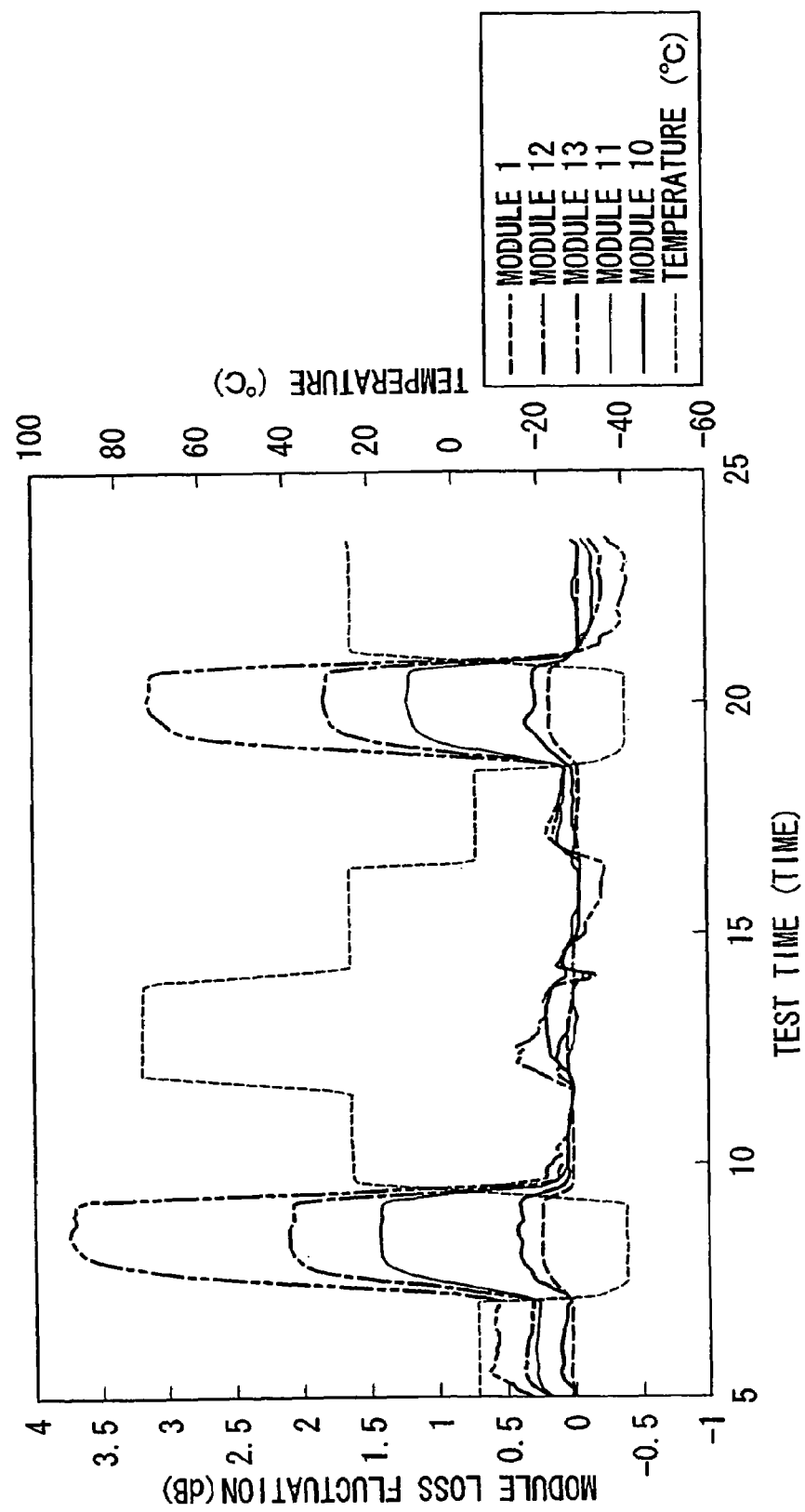
FIG. 6 is a graph for showing a temperature characteristics for a module of a dispersion-compensated optical fiber which uses a dispersion-compensated optical fiber in which a bending loss is varied.

Also, loss wavelength characteristics of these modules are shown in FIG. 5. Temperature characteristics are shown in FIG. 6.

TABLE 7

| No. | $\Delta 1$(%) | $\Delta 2$(%) | $\Delta 3$(%) | b/a | c/b | CORE RADIUS (µm) | CLADDING OUTER DIAMETER (µm) | FIRST COATING OUTER DIAMETER (µm) | SECOND COATING OUTER CIAMETER (µm) | SURFACE VISCOSITY (gf/mm) |
|---|---|---|---|---|---|---|---|---|---|---|
| 2 | 2.00 | −0.46 | 0.36 | 2.7 | 1.5 | 6.4 | 90 | 135 | 175 | 0.1 |
| 10 | 1.90 | −0.38 | 0.35 | 3.5 | 1.4 | 6.5 | 90 | 135 | 175 | 0.1 |
| 11 | 1.70 | −0.45 | 0.35 | 3.3 | 1.5 | 6.6 | 90 | 135 | 175 | 0.1 |
| 12 | 1.95 | −0.35 | 0.40 | 2.7 | 1.5 | 4.5 | 90 | 135 | 175 | 0.1 |
| 13 | 2.20 | −0.70 | — | 2.5 | — | 5.6 | 90 | 135 | 175 | 0.1 |

TABLE 8

| No. | WAVELENGTH (µm) | TRANSMISSION LOSS (µm) | WAVELENGTH DISPERSION (ps/nm/km) | PERFORMANCE INDEX (ps/nm/dB) | PMD (ps/$\sqrt{}$km) | BENDING LOSS (dB/m) 2R = 20 mm |
|---|---|---|---|---|---|---|
| 2 | 1.55 | 0.45 | −120 | 267 | 0.08 | 1.0 |
| 10 | 1.55 | 0.40 | −125 | 313 | 0.08 | 2.8 |
| 11 | 1.55 | 0.40 | −128 | 320 | 0.08 | 4.4 |
| 12 | 1.55 | 0.42 | −123 | 293 | 0.12 | 5.2 |
| 13 | 1.55 | 0.50 | −160 | 320 | 0.10 | 11.6 |

TABLE 9

| No. | MODULE NO. | MODULE LOSS (dB) | MODULE DISPERSION (ps/nm) | CONTAINABLE MODULE SIZE (WIDTH × DEPTH × HEIGHT) (mm) | | | VOLUME RATIO* (%) |
|---|---|---|---|---|---|---|---|
| 2 | MODULE 2 | 7.4 | −1700 | 205 | 205 | 21 | 37 |
| 10 | MODULE 10 | 6.4 | −1700 | 205 | 205 | 21 | 37 |
| 11 | MODULE 11 | 6.8 | −1703 | 200 | 200 | 21 | 35 |
| 12 | MODULE 12 | 7.0 | −1700 | 230 | 230 | 21 | 47 |
| 13 | MODULE 13 | 6.9 | −1700 | 185 | 185 | 21 | 30 |

*Volume ratio with reference to a module 1 in which a conventional dispersion compensated optical fiber is used.

Optical characteristics for these dispersion-compensated optical fibers are shown in a TABLE 8.

In these dispersion-compensated optical fiber, values such as $\Delta 1$, $\Delta 2$, $\Delta 3$, b/a, c/b, and a core radius are set to be values shown in the TABLE 8 by changing the bending loss. The outer diameter of the cladding, Young's modulus and thickness of the first coating layer, and Young's modulus and thickness of the second coating layer are the same.

Optical characteristics for a module of the dispersion-compensated optical fiber are shown in TABLE 9 under In the TABLE 9, although it is understood that the module losses are equivalent, there is a rapid increase in loss in a long wavelength if a bending loss is greater than that in FIG. 5, and there is a great loss in a usage wavelength range if the bending loss exceeds 5 dB/m. Although it is possible to use a module by limiting a usage wavelength range even if there is such a loss deterioration, it is not possible to use it because the loss deterioration is great if it exceeds 5 dB/m.

Furthermore, according to FIG. 6, it is understood that the temperature characteristics for the module loss in the module for the dispersion-compensated optical fiber which has a great bending loss is deteriorated in line with an increase in the bending loss. According to these factors, it is necessary that the bending loss of the dispersion-compensated optical fiber should be 5 dB/m or lower according to the present invention.

EXAMPLE 4

Six variations of dispersion-compensated optical fibers with a W-type profile shown in FIG. 1(c) are produced according to a commonly known method such as a VAD method, an MCVD method, or a PCVD method. Under such a condition, they are produced such that values such as Δ1, Δ2, Δ3, b/a, c/b, and a core radius are made so as to be shown in a TABLE 10. Under such a condition, the outer diameter of the cladding was varied in a range of 60 μm to 110 μm. In the first coating layer and the second coating layer, thickness are made constant such as 22.5 μm and 20 μm respectively. It is shown in the TABLE 10 together with parameters for refractive index distribution.

Here, a dispersion-compensated optical fibers in No. 14, No. 15, and No. 19 are produced for a purpose of a comparison. The dispersion-compensated optical fibers shown in No. 2, No. 16 to No. 18 are examples of the optical fiber according to the present invention.

Optical characteristics for these dispersion-compensated optical fibers are shown in a TABLE 11. It shows an identical optical characteristics.

Figure 7:
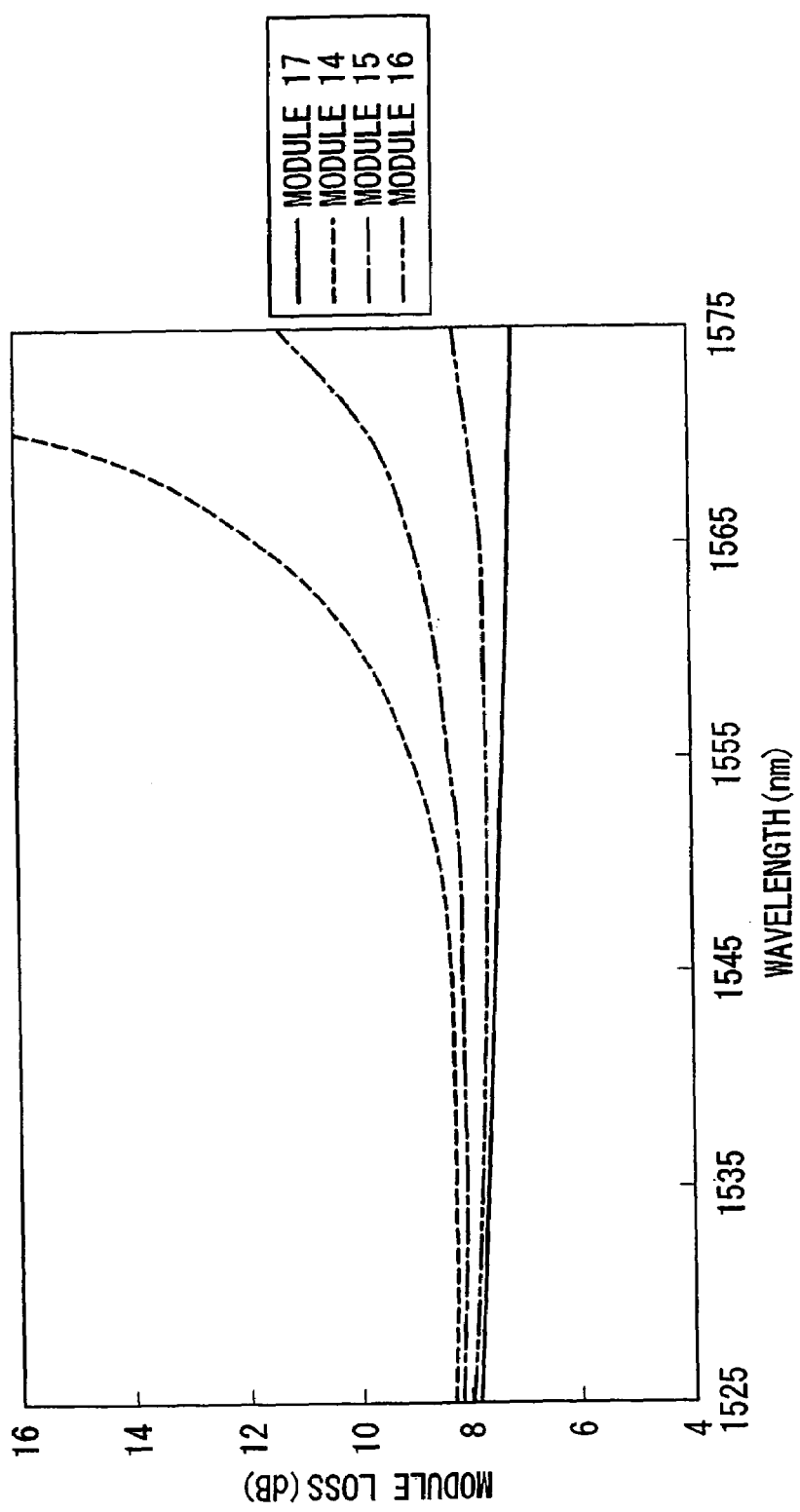
FIG. 7 is a graph for showing a loss wavelength characteristics for a module of a dispersion-compensated optical fiber which uses a dispersion-compensated optical fiber of which outer diameter of the cladding loss is varied.

A characteristics for a module of the dispersion-compensated optical fiber are shown in TABLE 12 under condition that a module is formed by winding these dispersion-compensated optical fiber in a small reel of which cylinder diameter is 80 mm by 40 g of winding tension and connecting a 1.3 μm bandwidth zero-dispersion single mode optical fiber with connecters to both ends thereof. Also, these module loss wavelength characteristics are shown in FIG. 7.

TABLE 11

| No. | WAVE-LENGTH (μm) | TRANS-MISSION LOSS (μm) | WAVE-LENGTH DISPER-SION (ps/nm/km) | PERFOR-MANCE INDEX (ps/nm/dB) | PMD (ps/√km) | BEND-ING LOSS (dB/m) 2R = 20 mm |
|---|---|---|---|---|---|---|
| 2 | 1.55 | 0.45 | −120 | 267 | 0.08 | 1.0 |
| 14 | 1.55 | 0.45 | −120 | 267 | 0.08 | 1.0 |
| 15 | 1.55 | 0.45 | −120 | 267 | 0.08 | 1.0 |
| 16 | 1.55 | 0.45 | −120 | 267 | 0.08 | 1.0 |
| 17 | 1.55 | 0.45 | −120 | 267 | 0.08 | 1.0 |
| 18 | 1.55 | 0.45 | −120 | 267 | 0.08 | 1.0 |
| 19 | 1.55 | 0.45 | −120 | 267 | 0.08 | 1.0 |

TABLE 12

| No. | MODULE NO. | MODULE LOSS (dB) | MODULE DIS-PERSION (ps/nm) | CONTAINABLE MODULE SIZE (WIDTH × DEPTH × HEIGHT) (mm) | | | VOL-UME RA-TIO* (%) |
|---|---|---|---|---|---|---|---|
| 2 | MODULE 2 | 7.4 | −1700 | 205 | 205 | 21 | 42 |
| 14 | MODULE 14 | 8.5 | −1700 | 190 | 190 | 21 | 32 |
| 15 | MODULE 15 | 8.1 | −1700 | 200 | 200 | 21 | 35 |
| 16 | MODULE 16 | 7.6 | −1700 | 210 | 210 | 21 | 39 |
| 17 | MODULE 17 | 7.4 | −1700 | 205 | 205 | 21 | 42 |
| 18 | MODULE 18 | 7.4 | −1700 | 230 | 230 | 21 | 47 |
| 19 | MODULE 19 | 7.4 | −1700 | 240 | 240 | 21 | 51 |

*Volume ratio with reference to a module 1 in which a conventional dispersion compensated optical fiber is used.

According to the TABLE 12, it is understood that although the module which uses the dispersion-compensated optical fibers of No. 14 and No. 15 is small with compared to conventional modules if it is wound in a small reel of which cylinder diameter is 80 mm, the module loss is deteriorated. Also, according to the TABLE 7, in particular,

TABLE 10

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 2 | 2.0 | −0.46 | 0.36 | 2.7 | 1.5 | 6.4 | 90 | 135 | 175 | 0.1 |
| 14 | 2.0 | −0.46 | 0.36 | 2.7 | 1.5 | 6.4 | 60 | 105 | 145 | 0.1 |
| 15 | 2.0 | −0.46 | 0.36 | 2.7 | 1.5 | 6.4 | 70 | 115 | 155 | 0.1 |
| 16 | 2.0 | −0.46 | 0.36 | 2.7 | 1.5. | 6.4 | 80 | 125 | 165 | 0.1 |
| 17 | 2.0 | −0.46 | 0.36 | 2.7 | 1.5 | 6.4 | 90 | 135 | 175 | 0.1 |
| 18 | 2.0 | −0.46 | 0.36 | 2.7 | 1.5 | 6.4 | 100 | 145 | 185 | 0.1 |
| 19 | 2.0 | −0.46 | 0.36 | 2.7 | 1.5 | 6.4 | 110 | 155 | 195 | 0.1 | it is understood that the loss deterioration in a long wavelength is conspicuous. It is understood that although the module loss is not deteriorated in the module for the dispersion-compensated optical fiber in which a dispersion-compensated optical fiber No. 18 of which outer diameter of the cladding is 100 μm or greater, the module is not small sufficiently.

According to these factors, it is understood that the outer diameter of the cladding should preferably be 80 μm to 100 μm.

EXAMPLE 5

Five variations of dispersion-compensated optical fibers with a W-type profile shown in FIG. 1(c) are produced according to a commonly known method such as a VAD method, an MCVD method, or a PCVD method. Under this condition, production is made such that Δ1, Δ2, Δ3, b/a, c/b, a core radius, a diameter of the cladding, Young's modulus and thickness of the first coating layer, and Young's modulus and thickness of the second coating layer are constant as shown in the TABLE 13. The surface viscosity was varied in a range of 0.1 to 12 gf/mm by varying an atmospheric oxygen density during a drawing operation in a range of 0.1% to several percents when an ultraviolet-ray-curable resin is hardened.

Here, a dispersion-compensated optical fibers in No. 2, No. 20 to No. 22 are embodiments for the optical fiber according to the present invention. The dispersion-compensated optical fiber No. 23 is produced for a purpose of comparison.

TABLE 13

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 2 | 2.00 | −0.46 | 0.36 | 2.7 | 1.5 | 6.4 | 90 | 135 | 175 | 0.1 |
| 20 | 2.00 | −0.46 | 0.36 | 2.7 | 1.5 | 6.4 | 90 | 135 | 175 | 0.3 |
| 21 | 2.00 | −0.46 | 0.36 | 2.7 | 1.5 | 6.4 | 90 | 135 | 175 | 3 |
| 22 | 2.00 | −0.46 | 0.36 | 2.7 | 1.5 | 6.4 | 90 | 135 | 175 | 9 |
| 23 | 2.00 | −0.46 | 0.36 | 2.7 | 1.5 | 6.4 | 90 | 135 | 175 | 12 |

Optical characteristics for these dispersion-compensated optical fibers are shown in a TABLE 14.

In these dispersion-compensated optical fibers, only the surface viscosity were different; thus, the other optical characteristics were identical.

Figure 8:
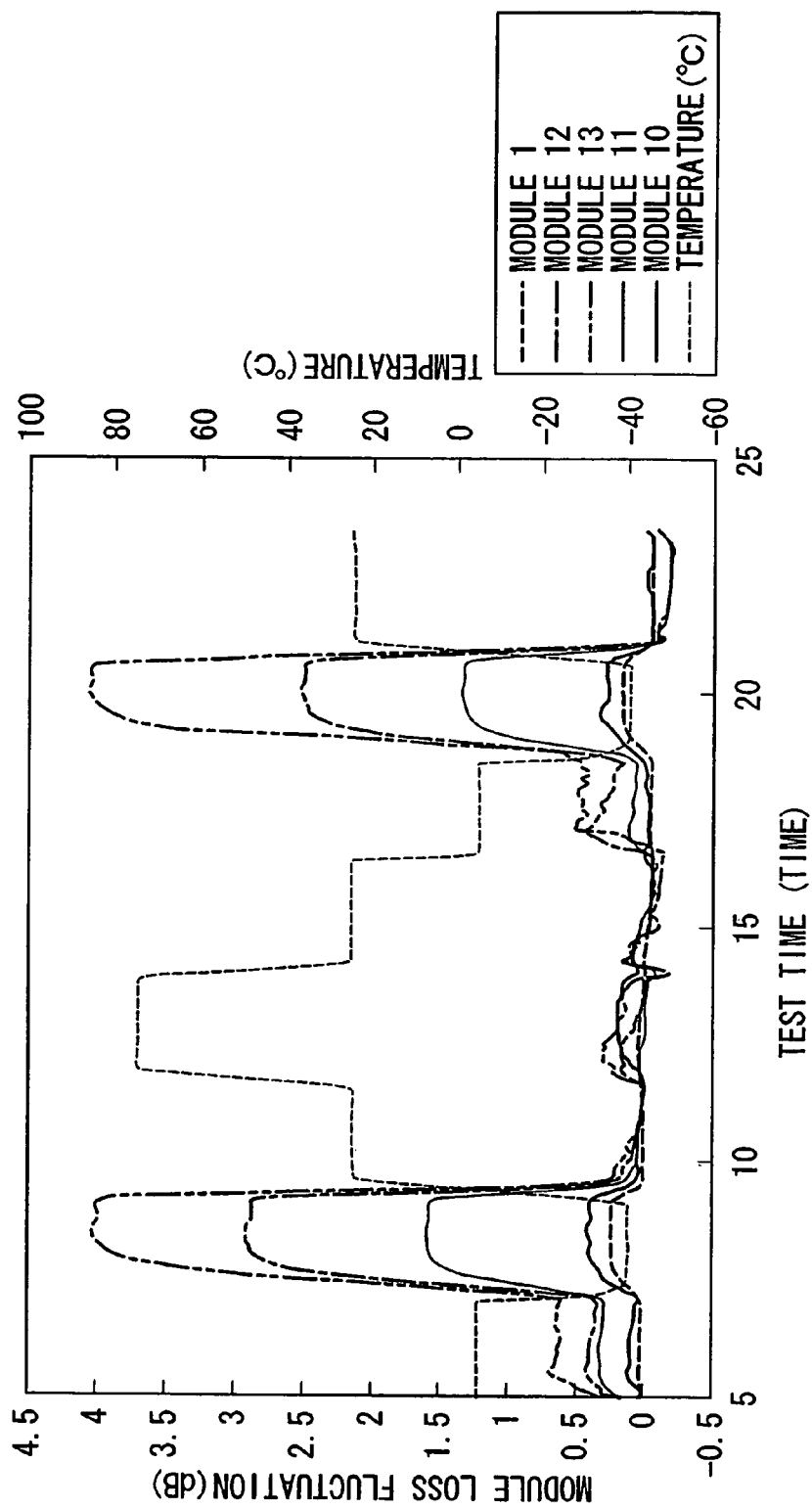
FIG. 8 is a graph for showing a loss wavelength characteristics for a module of a dispersion-compensated optical fiber which uses a dispersion-compensated optical fiber in which a surface viscosity is varied.

Optical characteristics for a module of the dispersion-compensated optical fiber and module size are shown in TABLE 15 under condition that a module is formed by winding these dispersion-compensated optical fiber in a small reel of which cylinder diameter is 80 mm by 40 g of winding tension and connecting a 1.3 μm bandwidth zero-dispersion single mode optical fiber with connecters to both ends thereof. Also, temperature characteristics for the module loss of these modules are shown in FIG. 8.

TABLE 14

| No. | WAVE-LENGTH (μm) | TRANS-MISSION LOSS (μm) | WAVE-LENGTH DISPER-SION (ps/nm/km) | PERFOR-MANCE INDEX (ps/nm/dB) | PMD (ps/√km) | BEND-ING LOSS (dB/m) 2R = 20 mm |
|---|---|---|---|---|---|---|
| 2 | 1.55 | 0.45 | −120 | 267 | 0.08 | 1.0 |
| 20 | 1.55 | 0.45 | −120 | 267 | 0.08 | 1.0 |
| 21 | 1.55 | 0.45 | −120 | 267 | 0.08 | 1.0 |
| 22 | 1.55 | 0.45 | −120 | 267 | 0.08 | 1.0 |
| 23 | 1.55 | 0.45 | −120 | 267 | 0.08 | 1.0 |

TABLE 15

| No. | MODULE NO. | MODULE LOSS (dB) | MODULE DIS-PERSION (ps/nm) | CONTAINABLE MODULE SIZE (WIDTH × DEPTH × HEIGHT) (mm) | | | VOL-UME RA-TIO* (%) |
|---|---|---|---|---|---|---|---|
| 2 | MODULE 2 | 7.4 | −1700 | 215 | 215 | 21 | 41 |
| 20 | MODULE 20 | 7.4 | −1700 | 215 | 215 | 21 | 41 |
| 21 | MODULE 21 | 7.4 | −1700 | 215 | 215 | 21 | 41 |

TABLE 15-continued

| No. | MODULE NO. | MODULE LOSS (dB) | MODULE DIS-PERSION (ps/nm) | CONTAINABLE MODULE SIZE (WIDTH × DEPTH × HEIGHT) (mm) | | | VOL-UME RA-TIO* (%) |
|---|---|---|---|---|---|---|---|
| 22 | MODULE 22 | 7.4 | −1700 | 215 | 215 | 21 | 41 |
| 23 | MODULE 23 | 7.4 | −1700 | 215 | 215 | 21 | 41 |

*Volume ratio with reference to a module 1 in which a conventional dispersion compensated optical fiber is used.

According to the TABLE 15, it is understood that the optical characteristics and the module size are identical. However, according to FIG. 8, it is understood that the deterioration of the module loss under a low temperature condition is great according to an increase in a value of the surface viscosity. It is necessary that the module for the dispersion-compensated optical fiber should have stable optical characteristics against a various circumstance temperature. In general, it is required that the fluctuation of the module loss should vary with in ±0.5 dB or lower under condition a usage temperature range is −5° C. to +75° C. According to these factors, it is understood that the surface viscosity should be 10 gf/mm or lower. More preferably, it should be 1 gf/mm or lower.

EXAMPLE 6

A dispersion-compensated optical fibers with a W-type profile shown in FIG. 1(*c*) is produced according to a commonly known method such as a VAD method, an MCVD method, or a PCVD method. Under such a condition, they are produced such that values such as Δ1, Δ2, Δ3, b/a, c/b, and a core radius are made so as to be shown in a TABLE 16. Under such a condition, although an outer diameter of the cladding is constant, the thickness of the coating layer in each layer and the Young's modulus were varied.

Here, a dispersion-compensated optical fibers in No. 2, No. 24, and No. 28 are embodiments for the optical fiber according to the present invention. The dispersion-compensated optical fibers No. 25 to No. 27, and No. 29 to No. 32 are produced for a purpose of comparison.

TABLE 16

| No. | Δ1(%) | Δ2(%) | Δ3(%) | b/a | c/b | CORE RADIUS (µm) | CLADDING OUTER DIAMETER (µm) | FIRST COATING OUTER DIAMETER (µm) | THICKNESS OF FIRST COATING LAYER | YOUNG'S MODULUS OF FIRST COATING LAYER (kgf/mm²) | SECOND COATING OUTER DIAMETER (µm) | THICKNESS OF SECOND COATING LAYER | YOUNG'S MODULUS OF SECOND COATING LAYER (kgf/mm²) |
|---|---|---|---|---|---|---|---|---|---|---|---|---|---|
| 2 | 2.00 | −0.46 | 0.36 | 2.7 | 1.5 | 6.4 | 90 | 135 | 22.5 | 0.068 | 175 | 20 | 75 |
| 24 | 2.00 | −0.46 | 0.36 | 2.7 | 1.5 | 6.4 | 90 | 135 | 22.5 | 0.15 | 175 | 20 | 75 |
| 25 | 2.00 | −0.46 | 0.36 | 2.7 | 1.5 | 6.4 | 90 | 135 | 22.5 | 0.20 | 175 | 20 | 75 |
| 26 | 2.00 | −0.46 | 0.36 | 2.7 | 1.5 | 6.4 | 90 | 135 | 22.5 | 0.068 | 175 | 20 | 30 |
| 27 | 2.00 | −0.46 | 0.36 | 2.7 | 1.5 | 6.4 | 90 | 135 | 22.5 | 0.068 | 175 | 20 | 40 |
| 28 | 2.00 | −0.46 | 0.36 | 2.7 | 1.5 | 6.4 | 90 | 130 | 20 | 0.068 | 170 | 20 | 75 |
| 29 | 2.00 | −0.46 | 0.36 | 2.7 | 1.5 | 6.4 | 90 | 125 | 17.5 | 0.068 | 165 | 20 | 75 |
| 30 | 2.00 | −0.46 | 0.36 | 2.7 | 1.5 | 6.4 | 90 | 120 | 15 | 0.068 | 160 | 20 | 75 |
| 31 | 2.00 | −0.46 | 0.36 | 2.7 | 1.5 | 6.4 | 90 | 135 | 22.5 | 0.068 | 160 | 12.5 | 75 |
| 32 | 2.00 | −0.46 | 0.36 | 2.7 | 1.5 | 6.4 | 90 | 135 | 22.5 | 0.068 | 155 | 10 | 75 |

Optical characteristics for these dispersion-compensated optical fibers are shown in a TABLE 17.

In these dispersion-compensated optical fibers, the Δ1, Δ2, Δ3, b/a, c/b, and a core radius are constant; therefore, the optical characteristics were identical.

A screening test was performed before forming a module of these dispersion-compensated optical fibers. In the screening test, a constant expansion distortion is applied to an optical fiber in a longitudinal direction of the optical fiber so as to remove a low-rigidity part. In order to secure a reliability test of the module of the dispersion-compensated optical fiber, a rigidity which is greater than a certain level is required for the dispersion-compensated optical fiber which is used there. Under condition that a test is performed for applying 1% of expansion distortion for 1 (one) second, No. 26, 27, 31, and 32 were disconnected in several hundreds meters; thus, it was not possible to obtain a sufficient length (for example, approximately 10 km or more) for producing the module. This is because the Young's modulus of the second coating layers in No. 26, No. 27 is low and there is a lack of rigidity for enduring the expansion distortion in the No. 31, 32 of which second coating layers are thin.

Figure 9:
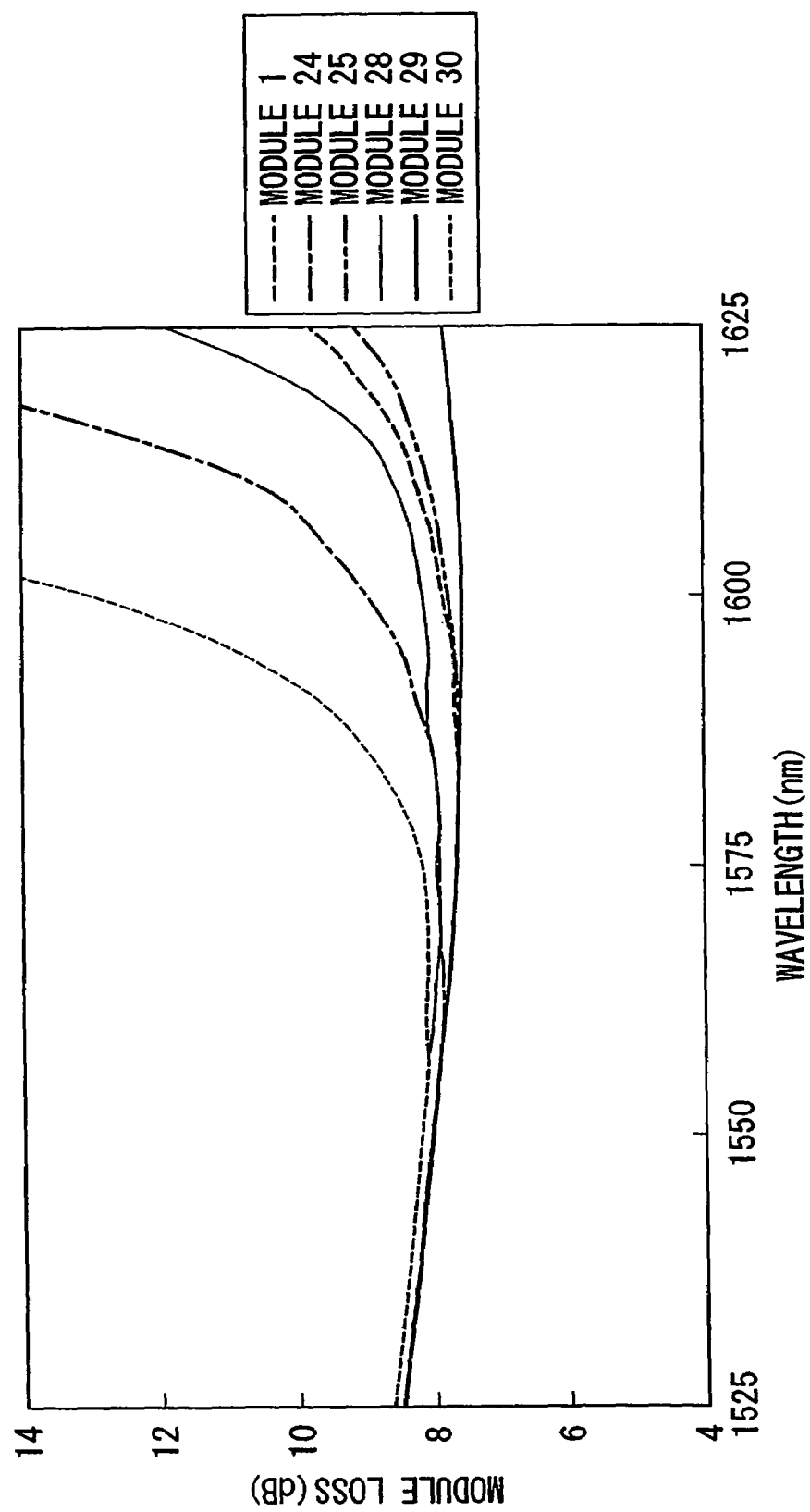
FIG. 9 is a graph for showing a loss wavelength characteristics for a module of a dispersion-compensated optical fiber which uses a dispersion-compensated optical fiber in which a Young's modulus of a coating layer and a thickness of the coating are varied.

Optical characteristics for a module of the dispersion-compensated optical fiber and module size are shown in TABLE 18 under condition that a module is formed by winding these dispersion-compensated optical fibers which has a necessary fiber length by the screening test in a small reel of which cylinder diameter is 80 mm by 40 g of winding tension and connecting a 1.3 µm bandwidth zero-dispersion single mode optical fiber with connecters to both ends thereof. Also, the loss wavelength characteristics for these modules are shown in FIG. 9.

TABLE 17

| No. | WAVELENGTH (µm) | TRANSMISSION LOSS (µm) | WAVELENGTH DISPERSION (ps/nm/km) | PERFORMANCE INDEX (ps/nm/dB) | PMD (ps/√km) | BENDING LOSS (dB/m) 2R = 20 mm |
|---|---|---|---|---|---|---|
| 2 | 1.55 | 0.45 | −120 | 267 | 0.08 | 1.0 |
| 24 | 1.55 | 0.45 | −120 | 267 | 0.08 | 1.0 |
| 25 | 1.55 | 0.45 | −120 | 267 | 0.08 | 1.0 |
| 26 | 1.55 | 0.45 | −120 | 267 | 0.08 | 1.0 |
| 27 | 1.55 | 0.45 | −120 | 267 | 0.08 | 1.0 |
| 28 | 1.55 | 0.45 | −120 | 267 | 0.08 | 1.0 |
| 29 | 1.55 | 0.45 | −120 | 267 | 0.08 | 1.0 |
| 30 | 1.55 | 0.45 | −120 | 267 | 0.08 | 1.0 |

TABLE 17-continued

| No. | WAVELENGTH (µm) | TRANSMISSION LOSS (µm) | WAVELENGTH DISPERSION (ps/nm/km) | PERFORMANCE INDEX (ps/nm/dB) | PMD (ps/√km) | BENDING LOSS (dB/m) 2R = 20 mm |
|---|---|---|---|---|---|---|
| 31 | 1.55 | 0.45 | −120 | 267 | 0.08 | 1.0 |
| 32 | 1.55 | 0.45 | −120 | 267 | 0.08 | 1.0 |

TABLE 18

| No. | MODULE NO. | MODULE LOSS (dB) | MODULE DISPERSION (ps/nm) |
|---|---|---|---|
| 2 | MODULE 2 | 7.4 | −1700 |
| 24 | MODULE 24 | 8.0 | −1700 |
| 25 | MODULE 25 | 8.0 | −1700 |
| 26 | MODULE 26 | — | — |
| 27 | MODULE 27 | — | — |
| 28 | MODULE 28 | 8.0 | −1700 |
| 29 | MODULE 29 | 8.2 | −1700 |
| 30 | MODULE 30 | 8.2 | −1700 |
| 31 | MODULE 31 | — | — |
| 32 | MODULE 32 | — | — |

*Volume ratio with reference to a module 1 in which a conventional dispersion compensated optical fiber is used.

According to the TABLE 18, although it is understood that there is not a great loss deterioration in 1.55 µm, according to FIG. 9, it is understood that the module loss is deteriorated in a long wavelength in the module in which the dispersion-compensated optical fibers No. 25, 29, and 30 are used. This is because the Young's modulus in the first coating layer which serves as an absorbing layer is high in No. 25. Also, this is because the loss is deteriorated because an influence of a side pressure reaches at the core section via the cladding because the first coating layer is thin in No. 29, 30.

According to these factors, it is understood that it is necessary that the Young's modulus in the first coating layer should be 0.15 kgf/mm² or lower, the Young's modulus in the second coating layer should be 50 kgf/mm² or higher, and the thickness of the second coating layer should be 15 µm to 30 µm.

EXAMPLE 7

Seven variations of dispersion-compensated optical fibers with a W-type profile shown in FIG. 1(b) or with a W-type profile with ring as shown in FIG. 1(c) are produced according to a commonly known method such as a VAD method, an MCVD method, or a PCVD method Under such a condition, they are produced such that values such as Δ1, Δ2, Δ3, b/a, c/b, and a core radius are made so as to be shown in a TABLE 19.

Here, a dispersion-compensated optical fibers in No. 2, No. 33 to No. 37 are embodiments for the optical fiber according to the present invention. The dispersion-compensated optical fibers No.38 and No.39 are produced for a purpose of comparison.

TABLE 21

| No. | MODULE NO. | MODULE LOSS (dB) | MODULE DIS-PERSION (ps/nm) | CONTAINABLE MODULE SIZE (WIDTH × DEPTH × HEIGHT) (mm) | | | VOLUME RATIO* (%) |
|---|---|---|---|---|---|---|---|
| 2 | MODULE 2 | 7.4 | −1710 | 205 | 205 | 21 | 42 |
| 33 | MODULE 33 | 6.8 | −1703 | 180 | 180 | 21 | 29 |
| 34 | MODULE 34 | 7.0 | −1650 | 170 | 170 | 21 | 25 |
| 35 | M0DULE 35 | 8.0 | −1710 | 200 | 200 | 21 | 35 |
| 36 | MODULE 36 | 6.8 | −1703 | 200 | 200 | 21 | 35 |
| 37 | MODULE 37 | 6.8 | −1703 | 200 | 200 | 21 | 35 |
| 38 | MODULE 38 | 7.5 | −1720 | 200 | 200 | 21 | 35 |
| 39 | MODULE 39 | 8.2 | −1720 | 200 | 200 | 21 | 35 |

*Volume ratio with reference to a module 1 in which a conventional dispersion compensated optical fiber is used.

TABLE 19

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 2 | 2.00 | −0.43 | 0.36 | 2.7 | 1.5 | 6.4 | 90 | 135 | 175 | 0.1 |
| 33 | 2.00 | −0.72 | 0.36 | 2.7 | 1.5 | 6.4 | 80 | 125 | 165 | 0.1 |
| 34 | 2.60 | −1.40 | — | 2.0 | — | 4.4 | 100 | 140 | 180 | 0.1 |
| 35 | 1.70 | −0.40 | 0.35 | 3.5 | 1.4 | 6.7 | 90 | 135 | 175 | 0.2 |
| 36 | 1.70 | −0.38 | 0.35 | 3.5 | 1.4 | 6.5 | 90 | 135 | 175 | 0.2 |
| 37 | 1.70 | −0.45 | 0.35 | 3.3 | 1.5 | 6.6 | 90 | 135 | 175 | 0.2 |
| 38 | 2.00 | −0.45 | — | 3.0 | — | 6.7 | 90 | 135 | 175 | 0.1 |
| 39 | 1.90 | −1.40 | 0.45 | 2.7 | 1.5 | 5.8 | 90 | 135 | 175 | 0.1 |

Optical characteristics for these dispersion-compensated optical fibers are shown in a TABLE 20.

A value for an RDS which is an index for indicating a performance of the dispersion slope compensation was $0.0017$ $nm^{-1}$ to $0.0107$ $nm^{-1}$. A dispersion-compensated optical fiber No. 33 is a dispersion-compensated optical fiber for compensating a wavelength-dispersion-compensated optical fiber of NZ-DSF. A characteristics for a module of the dispersion-compensated optical fiber are shown in TABLE 21 under condition that a module is formed by winding these dispersion-compensated optical fiber in a small reel of which cylinder diameter is 80 mm by 40 g of winding tension and connecting a 1.3 μm bandwidth zero-dispersion single mode optical fiber with connecters to both ends thereof. A dispersion curve is shown in FIG. 10 under condition a dispersion compensation is performed by using a module for the dispersion-compensated optical fiber which is produced by using the dispersion-compensated optical fibers No. 2, 34, 35, 38, and 39.

Figure 10:
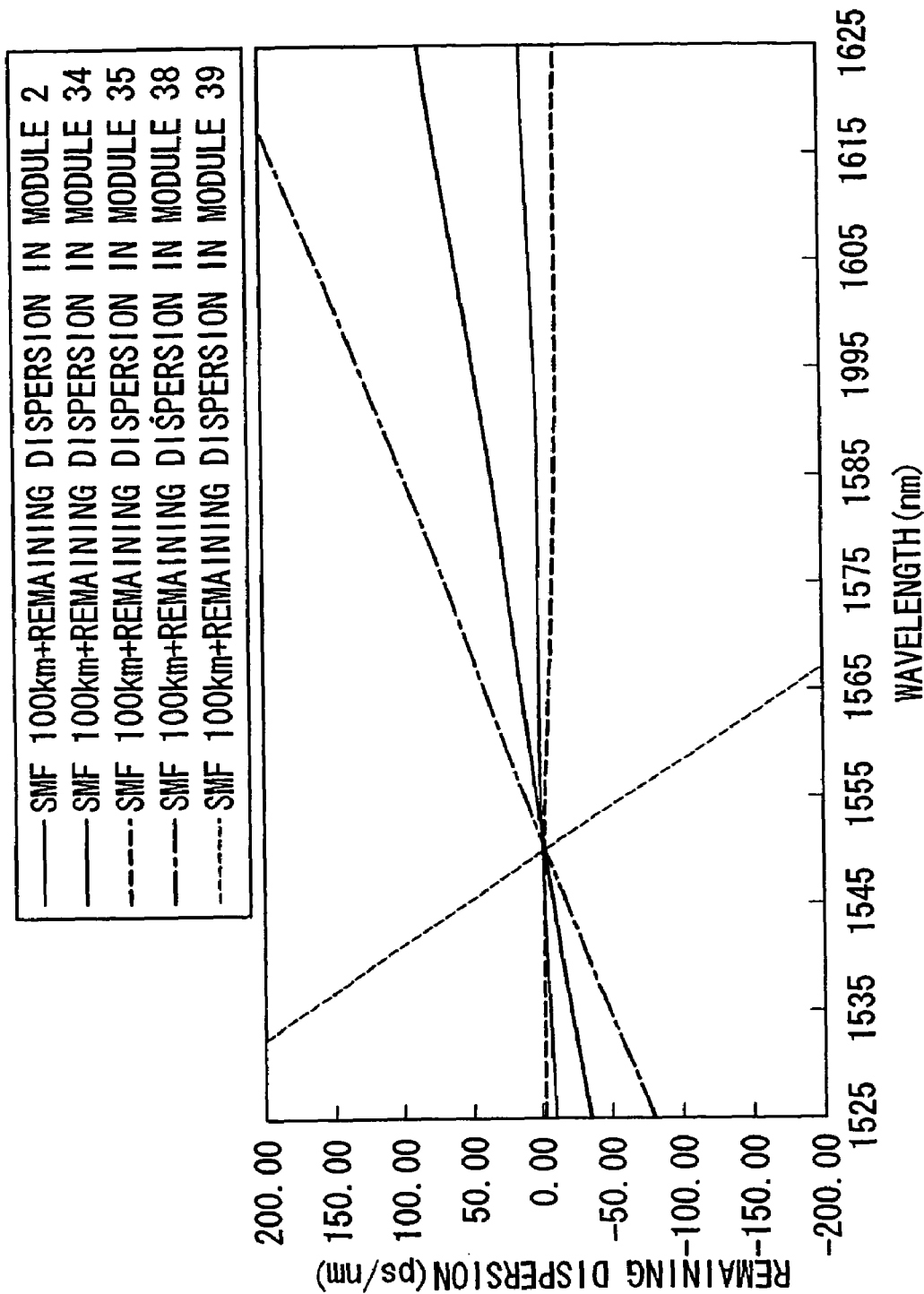
FIG. 10 is a graph which shows a remaining dispersion characteristics for a case in which an accumulated wavelength dispersion is compensated in S-SMF100 km by a module for the dispersion-compensated optical fiber which has a different RDS.

According to FIG. 10, it is understood that a remaining dispersion is great on both ends of the usage wavelength bandwidth in No. 38 in which the RDS is small and No. 39 in which the RDS is great; thus, the remaining dispersion is a disturbance for performing a high speed transmission if a transmission distance of the S-SMF is long.

TABLE 20

| No. | WAVELENGTH (μm) | TRANSMISSION LOSS (μm) | WAVELENGTH DISPERSION (ps/nm/km) | RDS (nm⁻¹) | PERFORMANCE INDEX (ps/nm/dB) | PMD (ps/√km) | BENDING LOSS (dB/m) 2R = 20 mm |
|---|---|---|---|---|---|---|---|
| 2 | 1.55 | 0.45 | −120 | −0.41 | 267 | 0.08 | 1.0 |
| 33 | 1.55 | 0.52 | −148 | −1.00 | 285 | 0.08 | 0.2 |
| 34 | 1.55 | 0.65 | −214 | −0.59 | 329 | 0.22 | 1.0 |
| 35 | 1.55 | 0.35 | −125 | −0.45 | 357 | 0.06 | 0.4 |
| 36 | 1.55 | 0.33 | −128 | −0.29 | 388 | 0.08 | 2.8 |
| 37 | 1.55 | 0.40 | −128 | −0.38 | 320 | 0.08 | 4.4 |
| 38 | 1.55 | 0.42 | −123 | −0.21 | 293 | 0.08 | 4.9 |
| 39 | 1.55 | 0.52 | −123 | −1.32 | 237 | 0.12 | 2.1 |

EXAMPLE 8

Seven variations of dispersion-compensated optical fibers with a W-type profile shown in FIG. 1(b) or with a W-type profile with ring as shown in FIG. 1(c) are produced according to a commonly known method such as a VAD method, an MCVD method, or a PCVD method Under such a condition, they are produced such that values such as Δ1, Δ2, Δ3, b/a, c/b, and a core radius are made so as to be shown in a TABLE 22.

Here, dispersion-compensated optical fibers in No. 40 to No. 45 are embodiments for the optical fiber according to the present invention. The dispersion-compensated optical fibers No. 46 and No. 47 are produced for a purpose of comparison.

Figure 11:
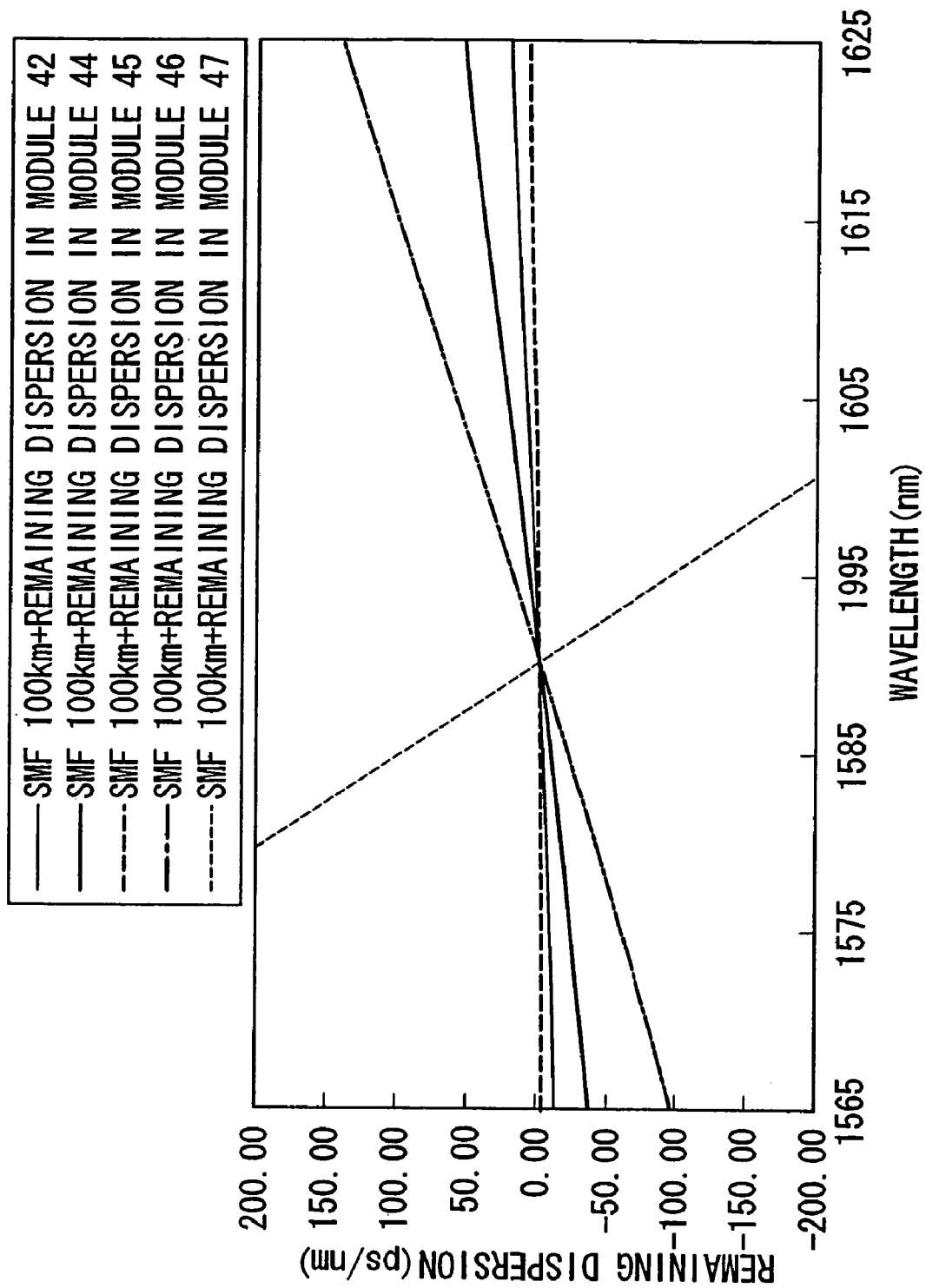
FIG. 11 is a graph which shows a remaining dispersion characteristics for a case in which an accumulated wavelength dispersion is compensated in S-SMF100 km by a module for the dispersion-compensated optical fiber which has a different RDS.

A characteristics for a module of the dispersion-compensated optical fiber are shown in TABLE 24 under condition that a module is formed by winding these dispersion-compensated optical fibers in a small reel of which cylinder diameter is 80 mm by 40 g of winding tension and connecting a 1.3 μm bandwidth zero-dispersion single mode optical fiber with connectors to both ends thereof. A dispersion curve is shown in FIG. 11 under condition a dispersion compensation is performed by using a module for the dispersion-compensated optical fiber which is produced by using the dispersion-compensated optical fibers No. 42, 44, 45, 46, and 47.

TABLE 22

| No. | Δ1(%) | Δ2(%) | Δ3(%) | b/a | c/b | CORE RADIUS (μm) | CLADDING OUTER DIAMETER (μm) | FIRST COATING OUTER DIAMETER (μm) | SECOND COATING OUTER CIAMETER (μm) | SURFACE VISCOSITY (gf/mm) |
|---|---|---|---|---|---|---|---|---|---|---|
| 40 | 2.00 | −0.43 | 0.36 | 2.7 | 1.5 | 6.4 | 90 | 135 | 175 | 0.1 |
| 41 | 2.00 | −0.72 | 0.36 | 2.7 | 1.5 | 6.4 | 80 | 125 | 165 | 0.1 |
| 42 | 2.60 | −1.40 | — | 2.0 | — | 4.4 | 100 | 140 | 180 | 0.1 |
| 43 | 1.70 | −0.40 | 0.35 | 3.5 | 1.4 | 6.7 | 90 | 135 | 175 | 0.2 |
| 44 | 1.70 | −0.38 | 0.35 | 3.5 | 1.4 | 6.5 | 90 | 135 | 175 | 0.2 |
| 45 | 1.70 | −0.45 | 0.35 | 3.3 | 1.5 | 6.6 | 90 | 135 | 175 | 0.3 |
| 46 | 2.00 | −0.45 | 0.30 | 30 | 1.5 | 5.5 | 90 | 135 | 175 | 0.2 |
| 47 | 1.90 | −1.40 | 0.55 | 2.9 | 1.5 | 5.5 | 90 | 135 | 175 | 0.2 |

TABLE 23

| No. | WAVELENGTH (μm) | TRANSMISSION LOSS (μm) | WAVELENGTH DISPERSION (ps/nm/km) | DISPERSION SLOPE (ps/nm²/km) | RDS (nm$^{-1}$) | PERFORMANCE INDEX (ps/nm/dB) | PMD (ps/√km) | BENDING LOSS (dB/m) 2R = 20 mm |
|---|---|---|---|---|---|---|---|---|
| 40 | 1.59 | 0.45 | −128 | −0.28 | 0.0022 | 284 | 0.12 | 1.0 |
| 41 | 1.59 | 0.52 | −148 | −1.00 | 0.0068 | 285 | 0.10 | 0.2 |
| 42 | 1.59 | 0.65 | −214 | −0.59 | 0.0028 | 329 | 0.10 | 1.0 |
| 43 | 1.59 | 0.35 | −123 | −0.29 | 0.0024 | 351 | 0.08 | 0.4 |
| 44 | 1.59 | 0.33 | −125 | −0.29 | 0.0023 | 379 | 0.08 | 2.8 |
| 45 | 1.59 | 0.40 | −128 | −0.38 | 0.0030 | 320 | 0.12 | 4.4 |
| 46 | 1.59 | 0.40 | −120 | −0.12 | 0.0010 | 300 | 0.07 | 4.4 |
| 47 | 1.59 | 0.40 | −123 | −1.63 | 0.0133 | 308 | 0.07 | 4.0 |

Optical characteristics for these dispersion-compensated optical fibers are shown in a TABLE 23.

These dispersion-compensated optical fibers are fibers for compensating the remaining dispersion in an L-band (wavelength 1.565 μm to 1.625 μm) of the transmission fiber; therefore, the measurement wavelength was set at 1.59 μm. A value for an RDS which is an index for indicating a performance of the dispersion slope compensation was 0.0010 nm$^{-1}$ to 0.0133 nm$^{-1}$. A dispersion-compensated optical fiber No. 41 is a dispersion-compensated optical fiber for compensating a wavelength-dispersion-compensated optical fiber of NZ-DSF.

TABLE 24

| No. | MODULE NO. | MODULE LOSS (dB) | MODULE DISPERSION (ps/nm) | CONTAINABLE MODULE SIZE (WIDTH × DEPTH × HEIGHT) (mm) | VOLUME RATIO* (%) |
|---|---|---|---|---|---|
| 40 | MODULE 40 | 8.0 | −1710 | 200 200 21 | 35 |
| 41 | MODULE 41 | 6.8 | −1703 | 180 180 21 | 29 |
| 42 | MODULE 42 | 7.0 | −1650 | 170 170 21 | 25 |
| 43 | MODULE 43 | 8.0 | −1710 | 200 200 21 | 35 |
| 44 | MODULE 44 | 6.8 | −1703 | 200 200 21 | 35 |
| 45 | MODULE 45 | 6.8 | −1703 | 200 200 21 | 35 |

TABLE 24-continued

| No. | MODULE NO. | MODULE LOSS (dB) | MODULE DISPERSION (ps/nm) | CONTAINABLE MODULE SIZE (WIDTH × DEPTH × HEIGHT) (mm) | | | VOLUME RATIO* (%) |
|---|---|---|---|---|---|---|---|
| 46 | MODULE 46 | 6.8 | −1703 | 200 | 200 | 21 | 35 |
| 47 | MODULE 47 | 6.8 | −1703 | 206 | 200 | 21 | 35 |

*Volume ratio with reference to a module 1 in which a conventional dispersion compensated optical fiber is used.

According to FIG. 11, it is understood that a remaining dispersion is great on both ends of the usage wavelength bandwidth in No. 46 in which the RDS is small and No. 47 in which the RDS is great; thus, the remaining dispersion is a disturbance for performing a high speed transmission if a transmission distance of the S-SMF is long.

INDUSTRIAL APPLICABILITY

As explained before, according to the present invention, it is possible to contain it in a small module with compared to a conventional module for a dispersion-compensated optical fiber in which a module loss is low, the PMD is low, and there is not an increase in a loss which is caused by the bending loss even if it is wound in a small reel. Compatibly, it is possible to realize a dispersion-compensated optical fiber which is suitable for the S-SMF and the NZ-DSF. In particular, it is possible to realize a module for a dispersion-compensated optical fiber in which there is not an outstanding increase in a loss which is caused by a micro-bend characteristics in a long wavelength, it is possible to contain in a small module with compared to a conventional module for a dispersion-compensated optical fiber, and there is a stable temperature characteristics such as ±0.5 dB or lower module loss in an ordinary usage temperature range (−5° C. to +70° C.).

Although the above exemplary embodiments of the present invention have been described, it will be understood by those skilled in the art that the present invention should not be limited to the described exemplary embodiments, but that various changes and modifications can be made within the spirit and scope of the present invention.

The invention claimed is:

1. A dispersion-compensated optical fiber, which, when operated in at least a wavelength which is selected from 1.53 μm to 1.63 μm, exhibits the following:
a bending loss of 5 dB/m or lower with a 20-mm bending diameter, a wavelength dispersion of −120 ps/nm/km or lower, an absolute value of the wavelength dispersion per a unit loss is 200 ps/nm/dB or higher, a cut-off wavelength for used length and used condition is 1.53 μm or lower, an outer diameter of a cladding is 80 μm to 100 μm, an outer diameter of a coating of 160 μm to 200 μm, said dispersion, optical fiber comprising:
a center core section;
an intermediate core section, disposed on an outer periphery of the center core section;
a ring core section, disposed on an outer periphery of the intermediate core section; and
a cladding, disposed on an outer periphery of the ring core section;
wherein
the relative refractive index difference of the center core section with respect to the cladding is about 1.6% to 2.6%;
a relative refractive index difference of the intermediate core section with respect to the cladding is about 0.30% to 1.4%;
a relative refractive index of the ring core section with respect to the cladding is about 0.30% to 1.0%;
a ratio of the outer radius of the intermediate core section to the outer radius of the center core section is about 1.5 to 3.5;
a ratio of the outer radius of the ring core section to the outer radius of the intermediate core section is about 1.2 to 2.0, and
the radius of the core is about 4 μm to 8 μm.

2. The dispersion compensated optical fiber according to claim 1, wherein, when operated in at least a wavelength which is selected from 1.53 μm to 1.63 μm:
the bending loss is about 5 dB/m or lower when it is wound by a 20 mm bending diameter,
the wavelength dispersion is about −120 ps/nm/km or lower,
the absolute value of the wavelength dispersion per a unit loss is about 200 ps/nm/dB or higher,
the cut-off wavelength for used length and used condition is about 1.53 μm or lower,
the outer diameter of the cladding is about 80 μm to 100 μm,
the outer diameter of the coating is about 160 μm to 200 μm, and
a viscosity of a surface of a coating resin is about 10 gf/mm or lower.

3. The dispersion compensating optical fiber according to claim 1, wherein a viscosity of an outer surface of the coating resin of the dispersion compensated optical fiber is about 10 gf/mm or lower.

4. The dispersion compensating optical fiber according to claim 1, wherein:
a Young's modulus of a first coating layer, which is disposed on an outer periphery of the cladding, is about 0.15 kgf/mm$^2$ or lower,
a thickness of the first coating layer is about 20 μm to 30 μm,
a Young's modulus of a second coating layer, which is disposed on an outer periphery of the first coating layer, is about 50 kgf/mm$^2$ or higher, and
a thickness of the second coating layer is about 15 μm to 30 μm.

5. The dispersion compensating optical fiber according to claim 1, wherein, in at least a wavelength which is selected from 1.53 μm to 1.57 μm, a quotient, which is obtained by dividing the dispersion slope by the wavelength dispersion, is about 0.0026 nm$^{-1}$ to 0.010 nm$^{-1}$.

6. The dispersion compensating optical fiber according to claim 1, wherein, in at least a wavelength which is selected from 1.53 μm to 1.57 μm, a quotient, which is obtained by dividing the dispersion slope by the wavelength dispersion, is about 0.0026 nm$^{-1}$ to 0.041 nm$^{-1}$.

7. The dispersion compensating optical fiber according to claim 1, wherein, in at least a wavelength which is selected from 1.57 μm to 1.63 μm, a quotient, which is obtained by dividing the dispersion slope by the wavelength dispersion, is about 0.0022 nm$^{-1}$ to 0.010 nm$^{-1}$.

8. The dispersion compensating optical fiber according to claim 1, wherein, in at least a wavelength which is selected from 1.57 μm to 1.63 μm, a quotient, which is obtained by dividing the dispersion slope by the wavelength dispersion, is about 0.0022 nm$^{-1}$ to 0.0035 nm$^{-1}$.

* * * * *